(ON LINE 8-8 OF FIG. 11)

(ON LINE 9-9 OF FIG. 11)

Aug. 20, 1946.   C. W. NORTON   2,405,974
TYPEWRITER FOR JUSTIFYING LINES
Filed July 8, 1944   19 Sheets-Sheet 7
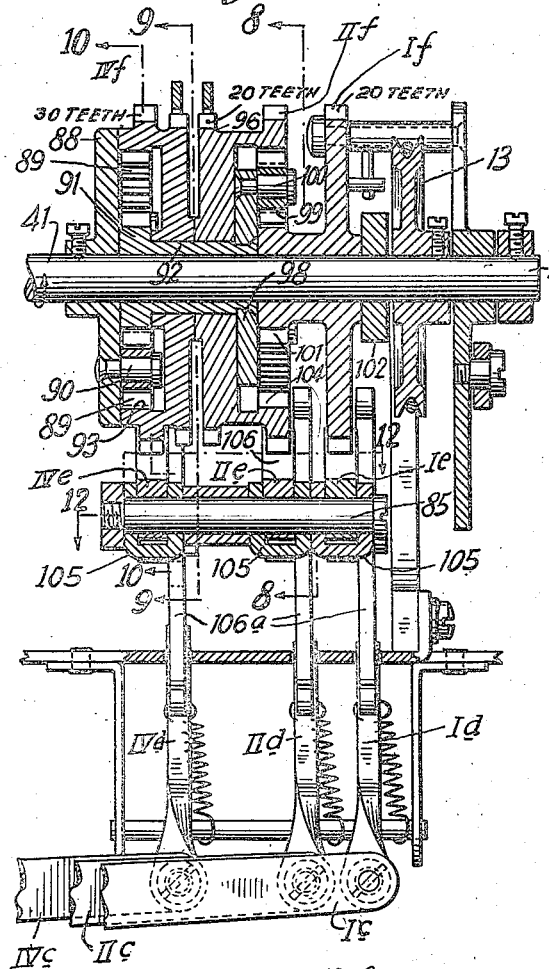
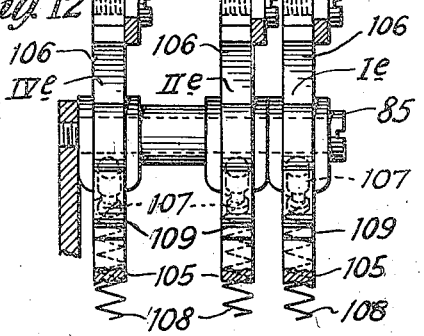
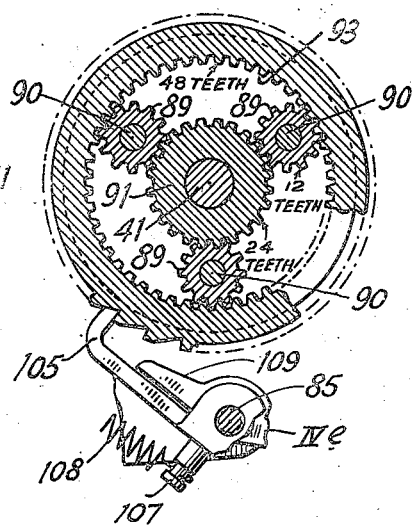
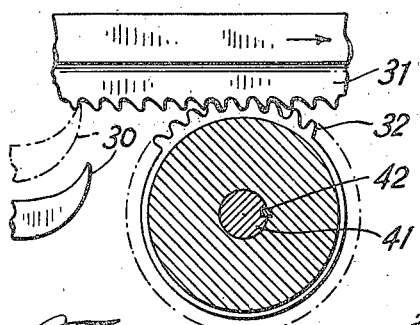
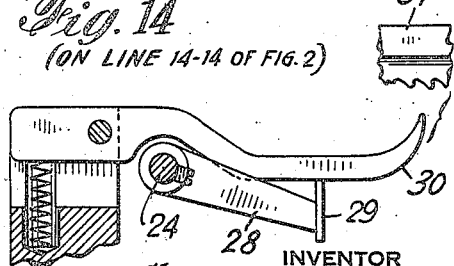
INVENTOR
Charles W. Norton
BY Ramsey, Kent + Chisholm
his ATTORNEYS Aug. 20, 1946.  C. W. NORTON  2,405,974
TYPEWRITER FOR JUSTIFYING LINES
Filed July 8, 1944  19 Sheets-Sheet 8
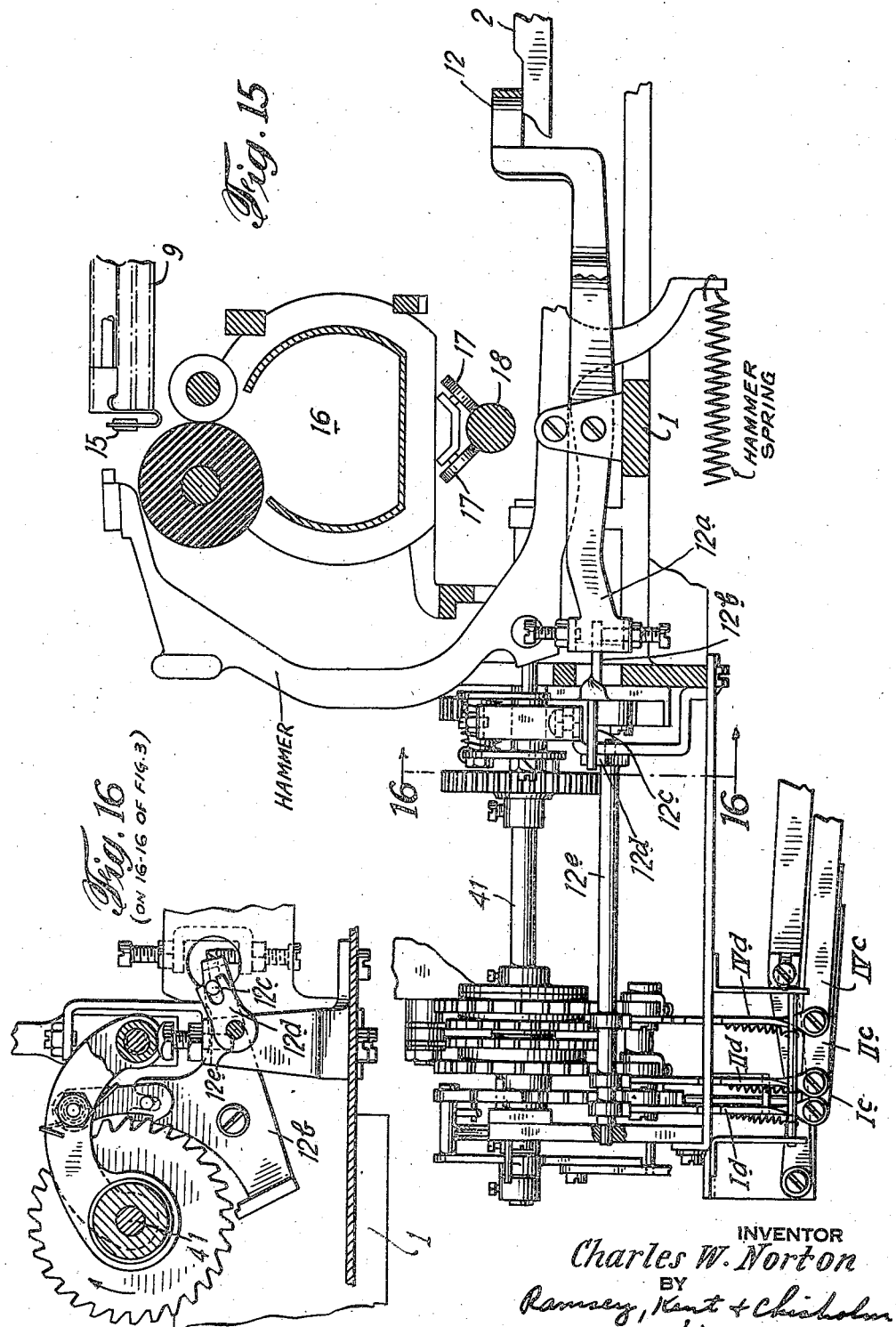
INVENTOR
Charles W. Norton
BY
Ramsey, Kent & Chisholm
his ATTORNEYS

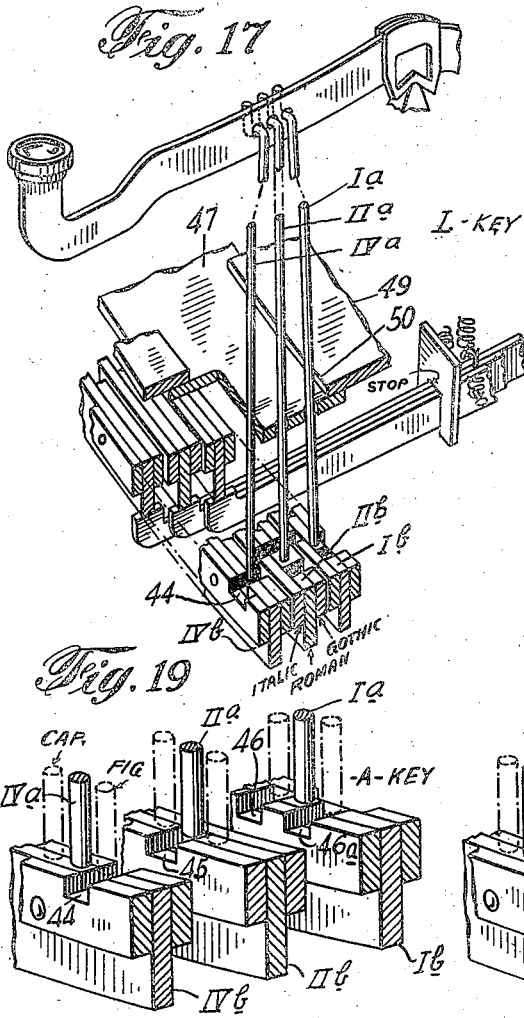
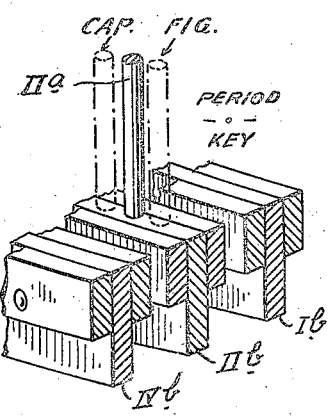
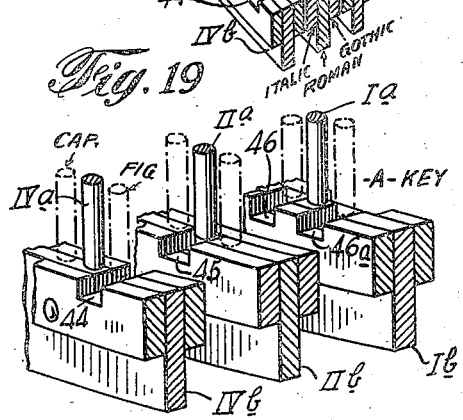
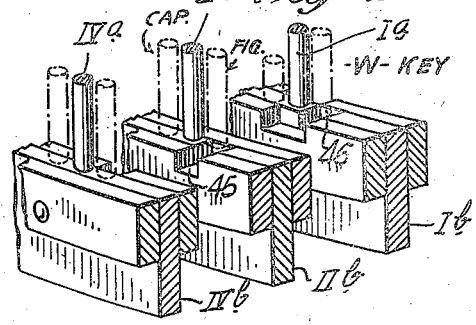
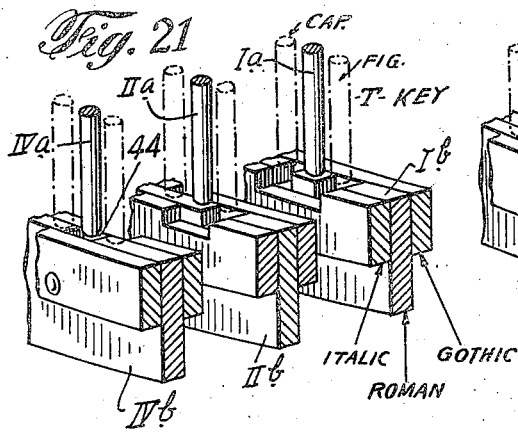
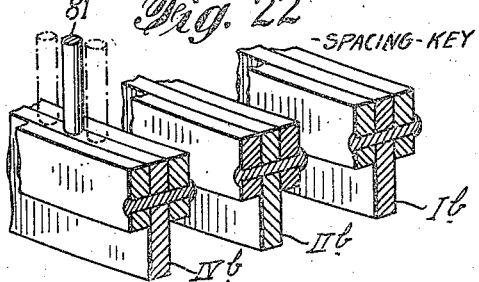

*Fig. 23*

| LETTER | UNITS SMALL | CAPS | FIG'S | UNITS |
|---|---|---|---|---|
| ROMAN LETTERS |||||
| A | 5 | 6 | ‛ | 2 |
| B | 5 | 6 | ¢ | 4 |
| C | 4 | 6 | ¾ | 7 |
| D | 5 | 6 | $ | 4 |
| E | 4 | 5 | 3 | 4 |
| F | 3 | 5 | % | 7 |
| G | 5 | 7 | — | 6 |
| H | 5 | 6 | & | 7 |
| I | 3 | 4 | 8 | 4 |
| J | 3 | 4 | ' | 2 |
| K | 5 | 6 | ( | 4 |
| L | 3 | 5 | ) | 4 |
| M | 7 | 7 | ? | 4 |
| N | 5 | 6 | * | 4 |
| O | 4 | 6 | 9 | 4 |
| P | 5 | 5 | 0 | 4 |
| Q | 5 | 6 | 1 | 4 |
| R | 4 | 6 | 4 | 4 |
| S | 4 | 5 | fl | 5 |
| T | 3 | 6 | 5 | 4 |
| U | 5 | 6 | 7 | 4 |
| V | 5 | 6 | ff | 6 |
| W | 7 | 7 | 2 | 4 |
| X | 5 | 6 | ¼ | 7 |
| Y | 5 | 6 | 6 | 4 |
| Z | 4 | 5 | fi | 5 |
| . | 2 | 2 | . | 2 |
| , | 2 | 2 | ’ | 2 |
| ; | 2 | : 2 | ½ | 7 |
| - | 4 | ! 2 | / | 5 |

Aug. 20, 1946.  C. W. NORTON  2,405,974
TYPEWRITER FOR JUSTIFYING LINES
Filed July 8, 1944  19 Sheets-Sheet 11

INVENTOR
Charles W. Norton
BY
Ramsey, Kent & Chisholm
his ATTORNEYS

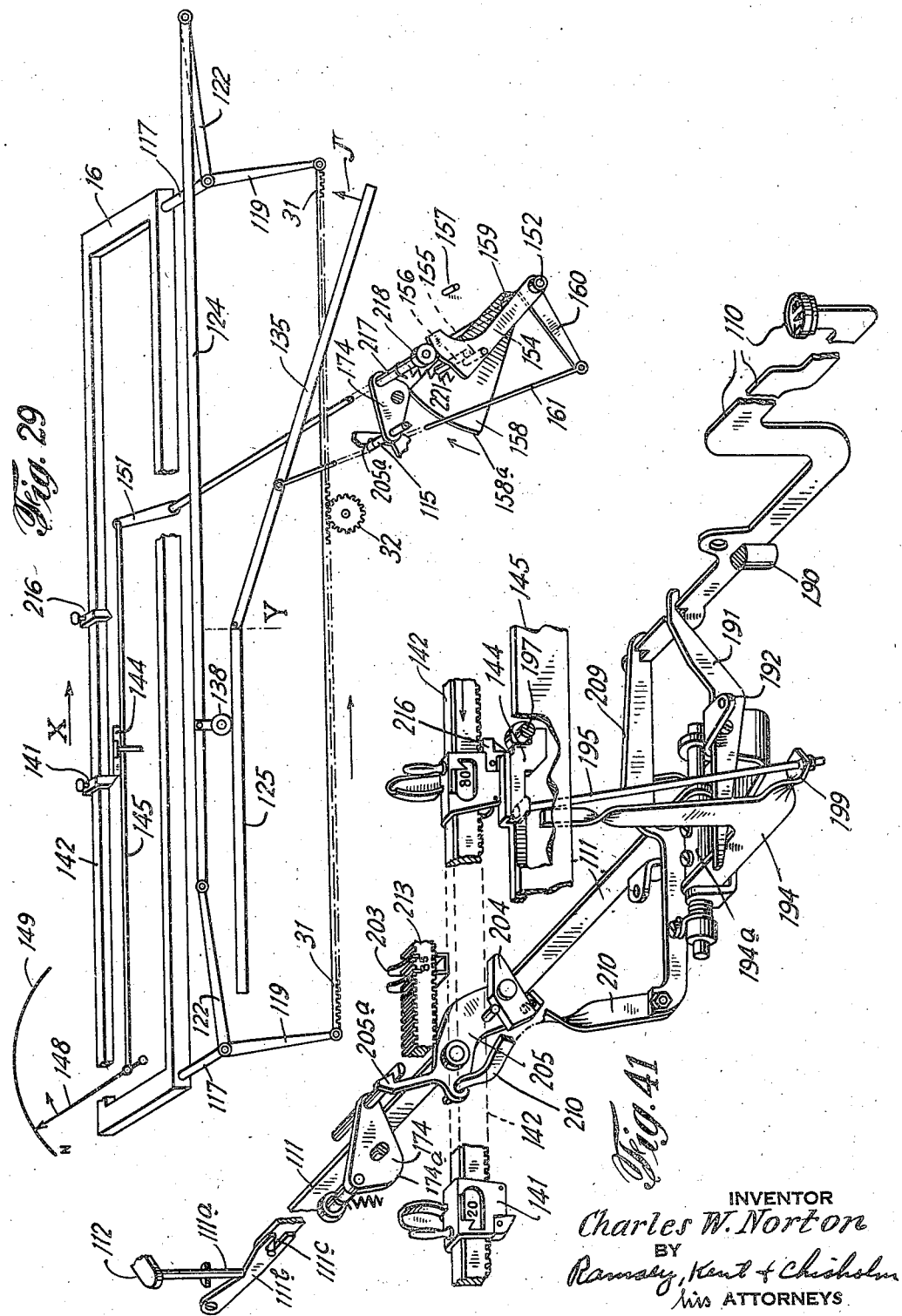

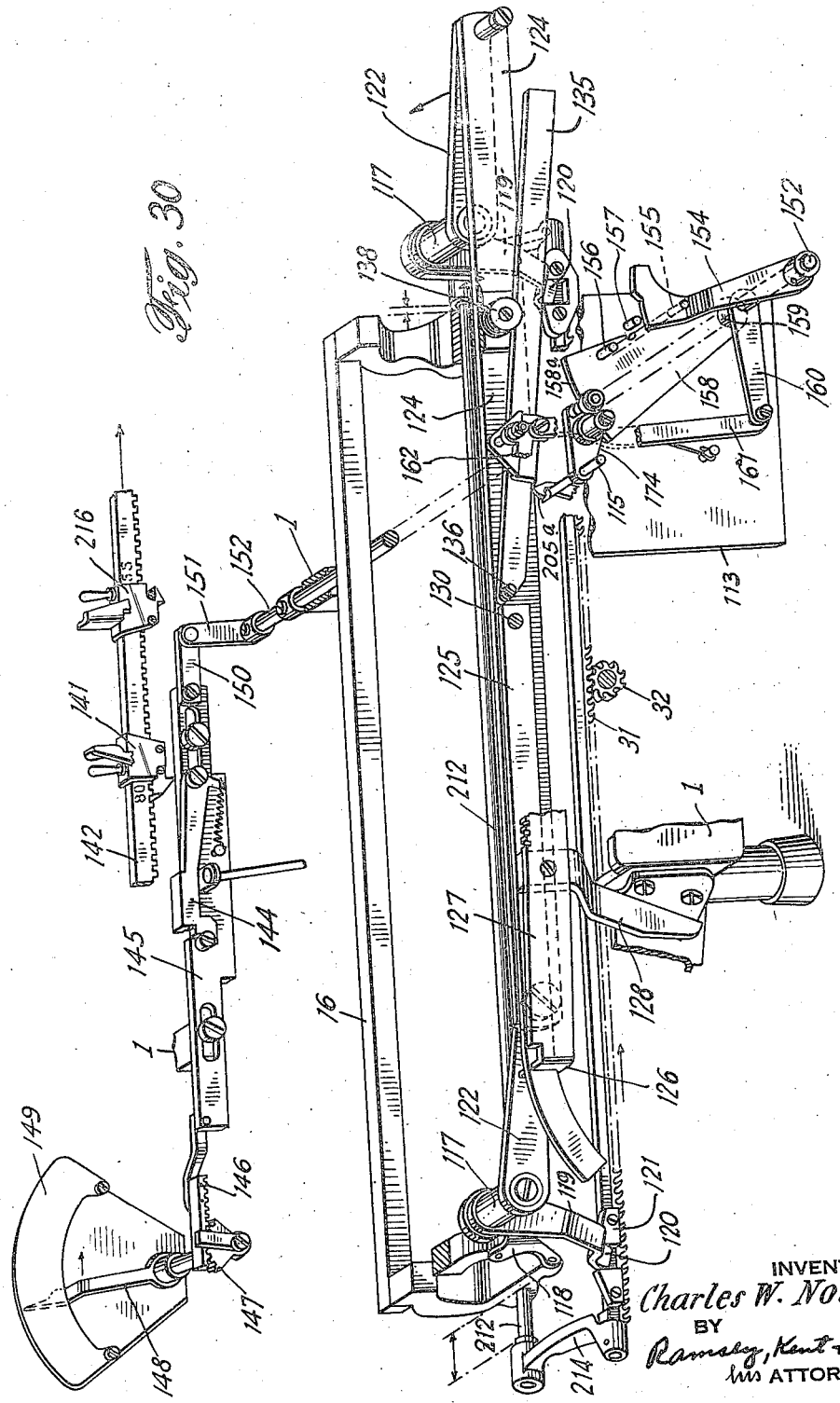

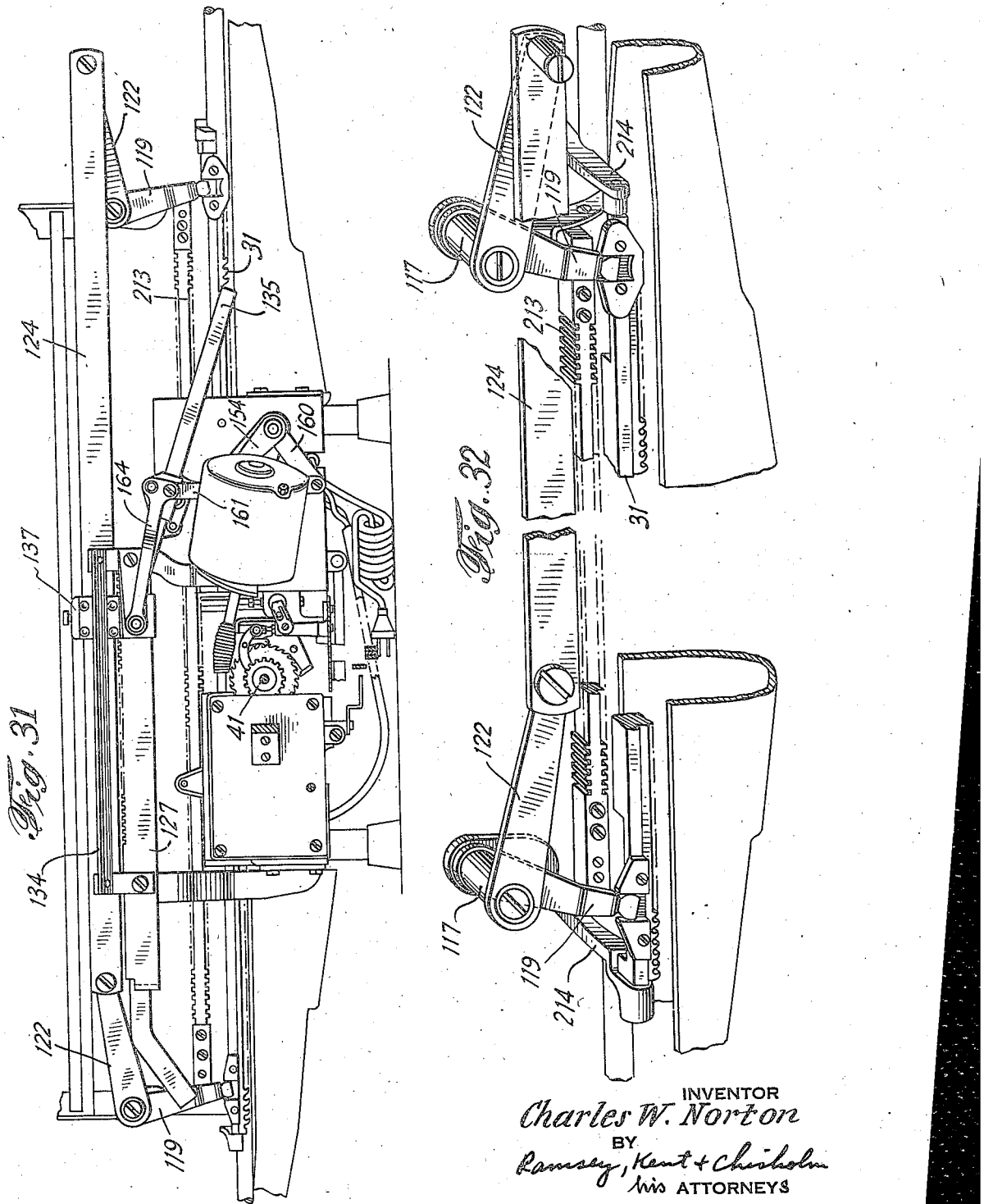

Aug. 20, 1946.  C. W. NORTON  2,405,974
TYPEWRITER FOR JUSTIFYING LINES
Filed July 8, 1944  19 Sheets-Sheet 15

INVENTOR
Charles W. Norton
BY
Ramsey, Kent & Chisholm
his ATTORNEYS

Aug. 20, 1946.   C. W. NORTON   2,405,974
TYPEWRITER FOR JUSTIFYING LINES
Filed July 8, 1944   19 Sheets-Sheet 16

INVENTOR
Charles W. Norton
BY
Ramsey, Kent & Chisholm
his ATTORNEYS

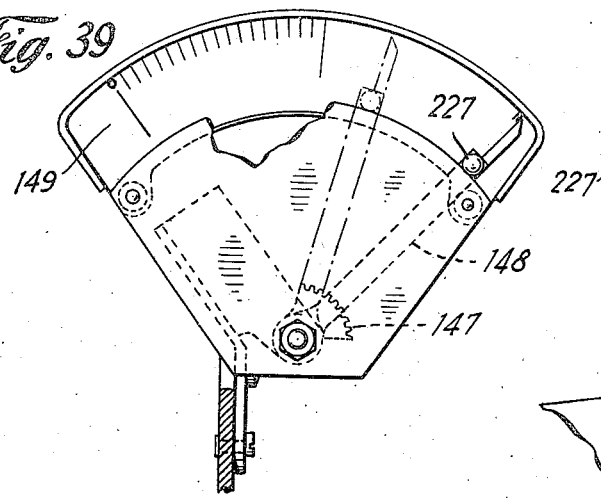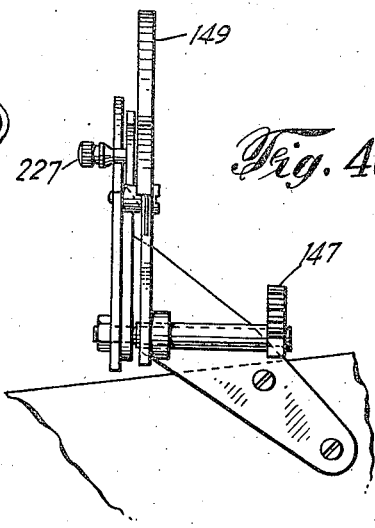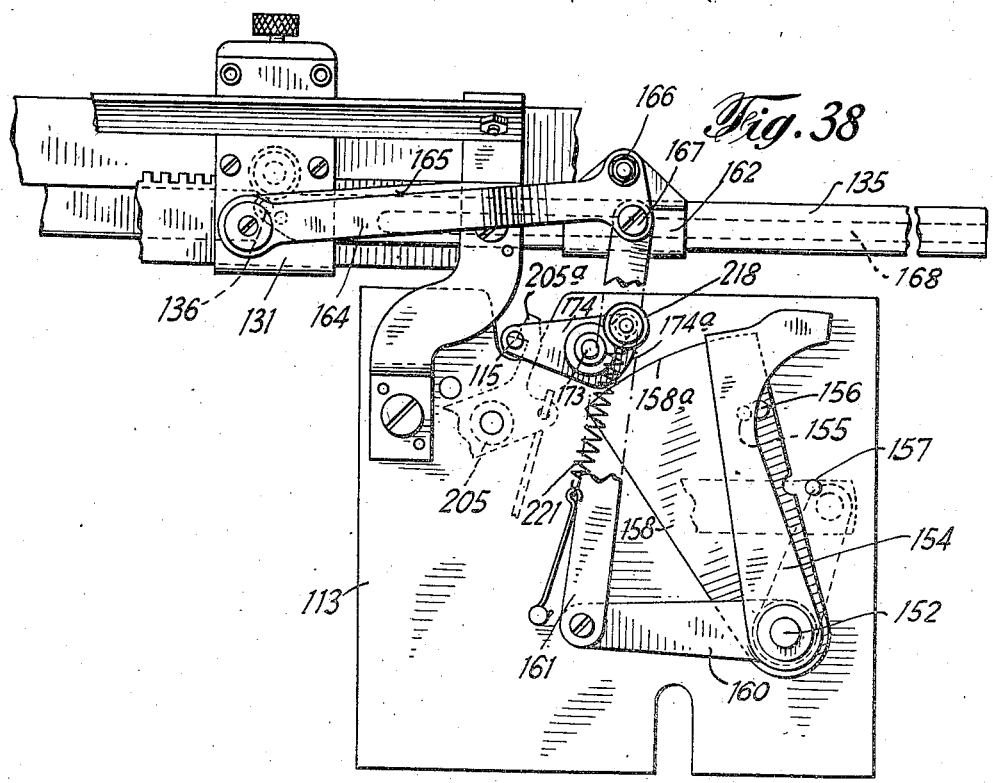

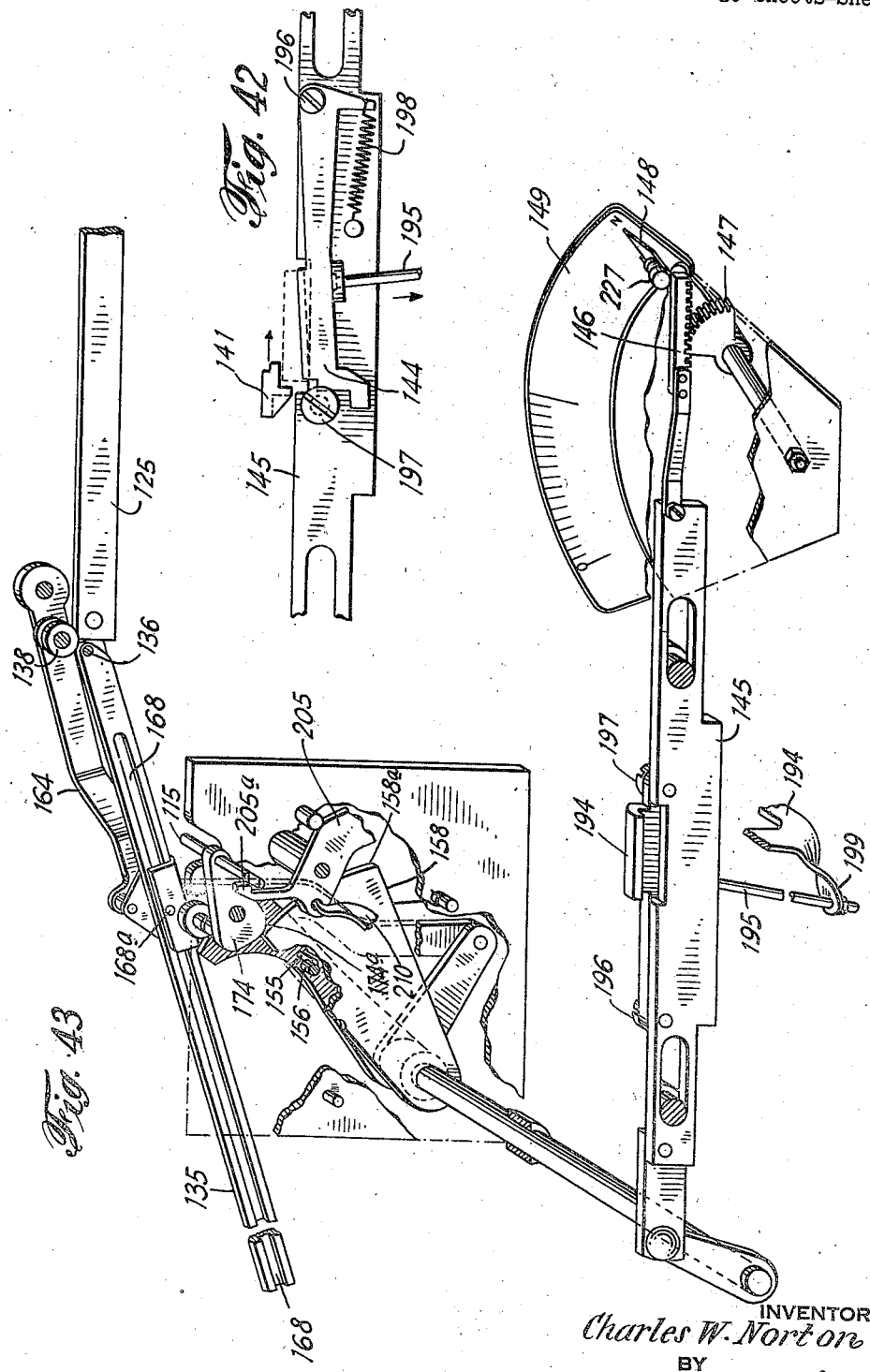

Aug. 20, 1946.  C. W. NORTON  2,405,974
TYPEWRITER FOR JUSTIFYING LINES
Filed July 8, 1944   19 Sheets-Sheet 19
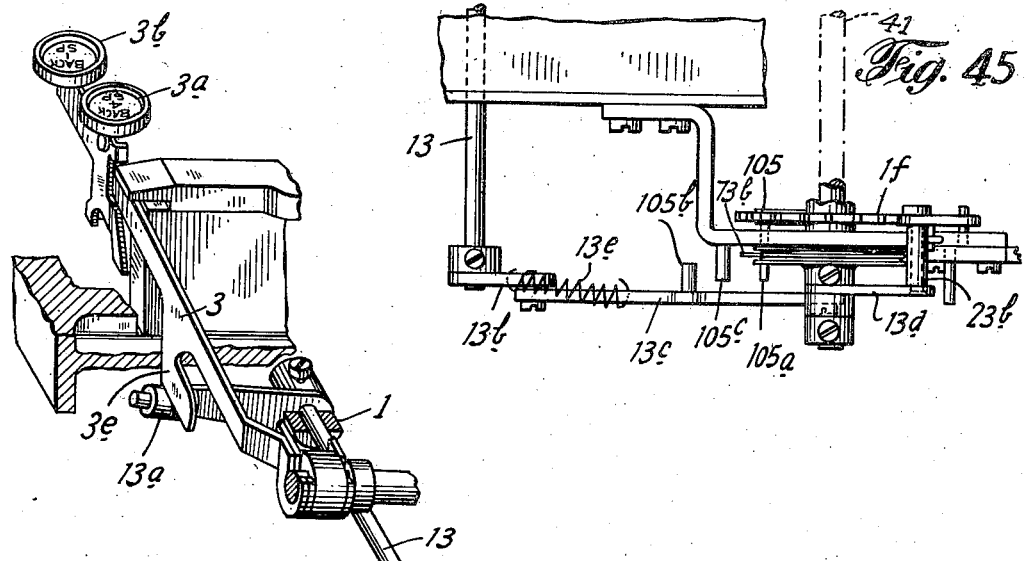
Fig. 45
Fig. 44
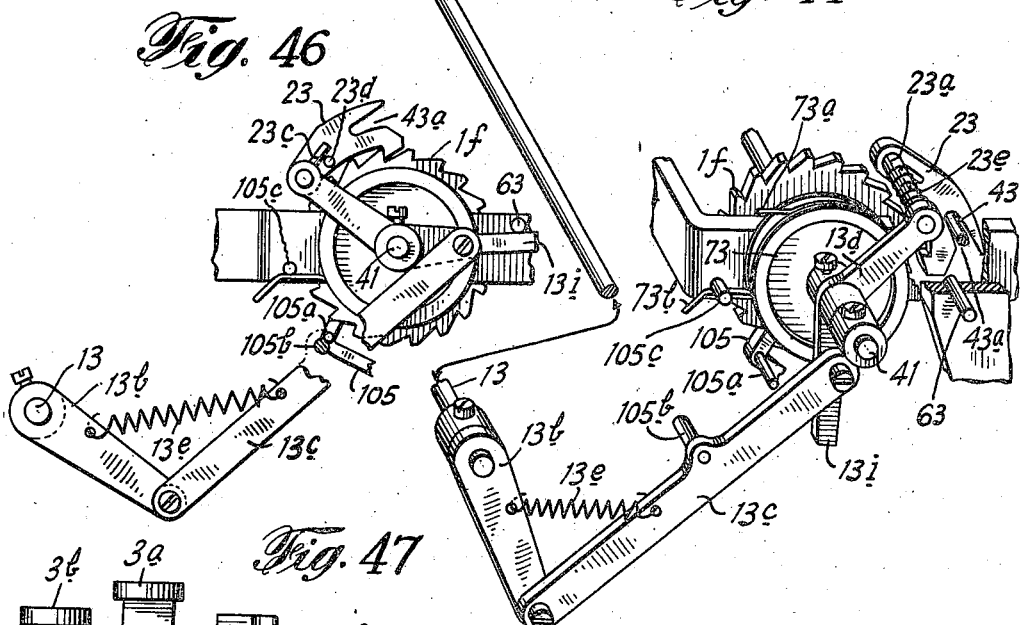
Fig. 46
Fig. 47
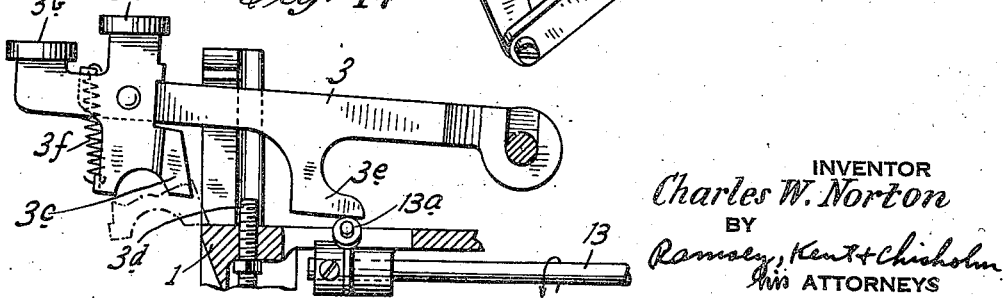
INVENTOR
Charles W. Norton
BY
Ramsey, Kent+Chisholm
His ATTORNEYS Patented Aug. 20, 1946

2,405,974

UNITED STATES PATENT OFFICE 2,405,974

TYPEWRITER FOR JUSTIFYING LINES

Charles W. Norton, West Orange, N. J., assignor to Ralph C. Coxhead Corporation, New York, N. Y., a corporation of Delaware Application July 8, 1944, Serial No. 543,981

12 Claims. (Cl. 197—84)

This invention relates to typewriting machines and as illustrated and described is embodied in a machine known in the art as a "Varityper," in which a supporting wheel carries interchangeable type shuttles, so that various styles and sizes of type may be used at will.

Machines according to this invention are capable of producing typed sheets in simulation of ordinary printed matter which may be used as "make ready" for reproduction by photolithographic or other printing processes. The printing type, however, must be given various conventional dimensions as to width, and it is desirable that different styles and sizes of type, such as occurs in ordinary printed matter in the way of headings, emphasis and the like, may be used. Means for attaining this result is disclosed in my Patent No. 2,298,805, issued October 13, 1942.

The invention as disclosed herein is capable of producing a typed sheet in characters of conventional dimensions differentially spaced in many different fonts of type; to accomplish this result requires new structures in respect of some of the functions, and a novel coordination of the different mechanisms and devices which must be conjointly employed; and it provides mechanism whereby the carriage feed may be advanced according to the varying width of the different characters, and at the same time affords means for justification of the lines to uniform length.

The combination involves the utilization of a paper carriage of sufficient width to permit the use of a relatively wide sheet of paper. In typing, an uneven or unjustified line is written in a column on the left of the paper, and a justified line is then written in a column on the right, after operation of a tabulator key. When the end of an unjustified line is being approached, the machine rings a bell, or establishes some other signal, and the operator may then type a few more characters before the ultimate limit is reached. This signal is the margin signal of the ordinary typewriter. The operator having finished writing the unjustified line depresses a tabulator key which automatically releases the carriage so that it may move to the left-hand margin of a new or second column at the right of the sheet of paper, and the operator then writes the same line over in this second column, and the machine automatically justifies this rewritten line so that it occupies a standard length. This result is obtained by the automatic action of the machine.

An object of the invention is to improve and adapt justifying mechanism to a platen carriage control which affords advance of the carriage in accordance with the different widths of the typed characters.

Another object of the invention is to provide means whereby different styles of type may be used in which the characters do not have the same relative widths in the different styles.

It is a further object of the invention to provide mechanism for the purpose stated that is adapted to the use of several different sizes of type. It is also an object of the invention to insure that the platen carriage advance cannot begin until the printing impression has been completed.

Another object of the invention is to provide a mechanism of the kind which is both simple and automatic, so that it may be used by any typist without special training or skill in its operation.

Another object of the invention is to provide improved back-spacing mechanism whereby the carriage may be back-spaced different distances per stroke.

Further objects and advantages will become apparent in the description of the invention, taken in connection with the accompanying drawings comprising a part of this specification and in which like parts are designated by like characters.

Fig. 10 is a sectional view on the line 10—10 of Fig. 11 and illustrates a cross section through escapement wheel IV—f together with the gearing connecting this escapement wheel to the escapement shaft.

Fig. 11 is a sectional view through the differential escapement mechanism on line 11—11 of Fig. 6.

Fig. 12 is a plan view of a part of the escapement dogs for the three escapement wheels taken on the line 12—12 of Fig. 11.

Fig. 13 is a detailed sectional view on line 13—13 of Fig. 3 and shows one of the pinions which connect the escapement shaft with the carriage rack.

Fig. 14 is a detailed view on line 14—14, Fig. 2, of the holding dog for the carriage rack which operates to lift the rack from engagement with the pinion during a change of pinion gear from one standard spacing to another.

Fig. 15 is an elevational view of the key controlled release mechanism for the hammer which drives the paper against the type to produce the printing impression.

Fig. 16 is a detailed view of the hammer release mechanism on line 16—16 of Figs. 3 and 15.

Fig. 17 is a detailed view of the push rod controls of type key "L," in their relation to the three universal bars.

Fig. 18 is a detail view of the push rod associated with the period (".") key.

Fig. 19 illustrates the push rods carried by the letter key "A," showing in dotted lines the effect of the shift keys on these push rods in relation to the three universal bars.

Fig. 20 illustrates the push rods connected with the "W" key, showing in dotted lines the effect of the operation of the shift keys on these rods relative to the universal bars.

Fig. 21 illustrates the push rods connected with the "T" key.

Fig. 22 illustrates the push rod associated with the spacing key and shows that it is applicable to only one universal bar.

Fig. 23 is a table showing the units of escapement movement allowed for each designated letter and character of the roman style.

Figs. 27 and 28 (Sheet 5) illustrate details of the mechanism for adjusting the three universal bars for use with the roman, gothic or italic style of type.

Fig. 29 is a diagrammatic view illustrating the principles of construction of the justification mechanism.

Fig. 30 is a perspective view of the mechanism, with shaft 152 axially displaced, whereby justification of the typewritten line is accomplished.

Fig. 31 is an elevational view of the justification mechanism from the back of the machine.

Fig. 32 is a perspective view showing certain details of the justification mechanism with parts broken away.

Fig. 38 is a detail view of the sine bar and holding mechanism therefor.

Fig. 39 is a detail view of the pointer for showing the remaining unjustified line space.

Fig. 40 is an end elevation of the construction shown in Fig. 39.

Fig. 41 (Sheet 12) is a perspective view of the tabulator key and connected mechanism in normal position.

Fig. 42 illustrates the stop on the operating bar which is releasable by the tabulating key preparatory to typing the justified line.

Fig. 43 is a perspective view from the front of the machine immediately after the carriage has been placed in position for typing an unjustified line, showing the sine bar holding dog about to be latched in inoperative position.

Fig. 44 is a broken perspective view of the back-spacing key and mechanism.

Fig. 45 is a plan view of a portion of the back-spacing ratchet shown in Fig. 44.

Fig. 46 is a side elevation of the back-spacing ratchet in the position taken in back-spacing four units.

Fig. 47 is a view in side elevation of the two-button back-spacing key.

Fig. 48 (Sheet 3) is a sectional view of the indicator for positioning carriage for left-hand margin of unjustified and justified lines.

Figure 3:
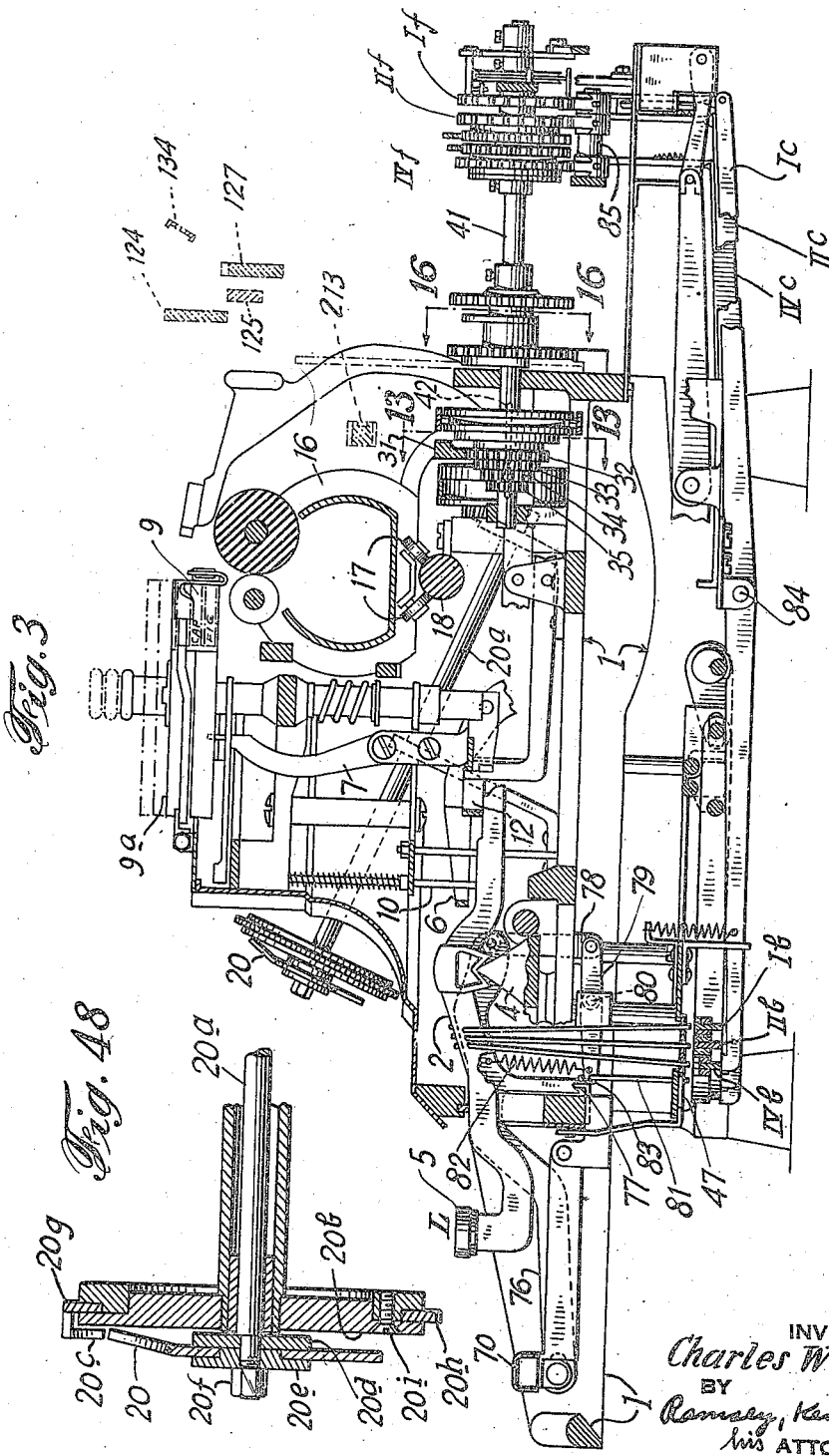
Fig. 3 is a vertical section on the line 3—3 of Fig. 2.
Figure 4:
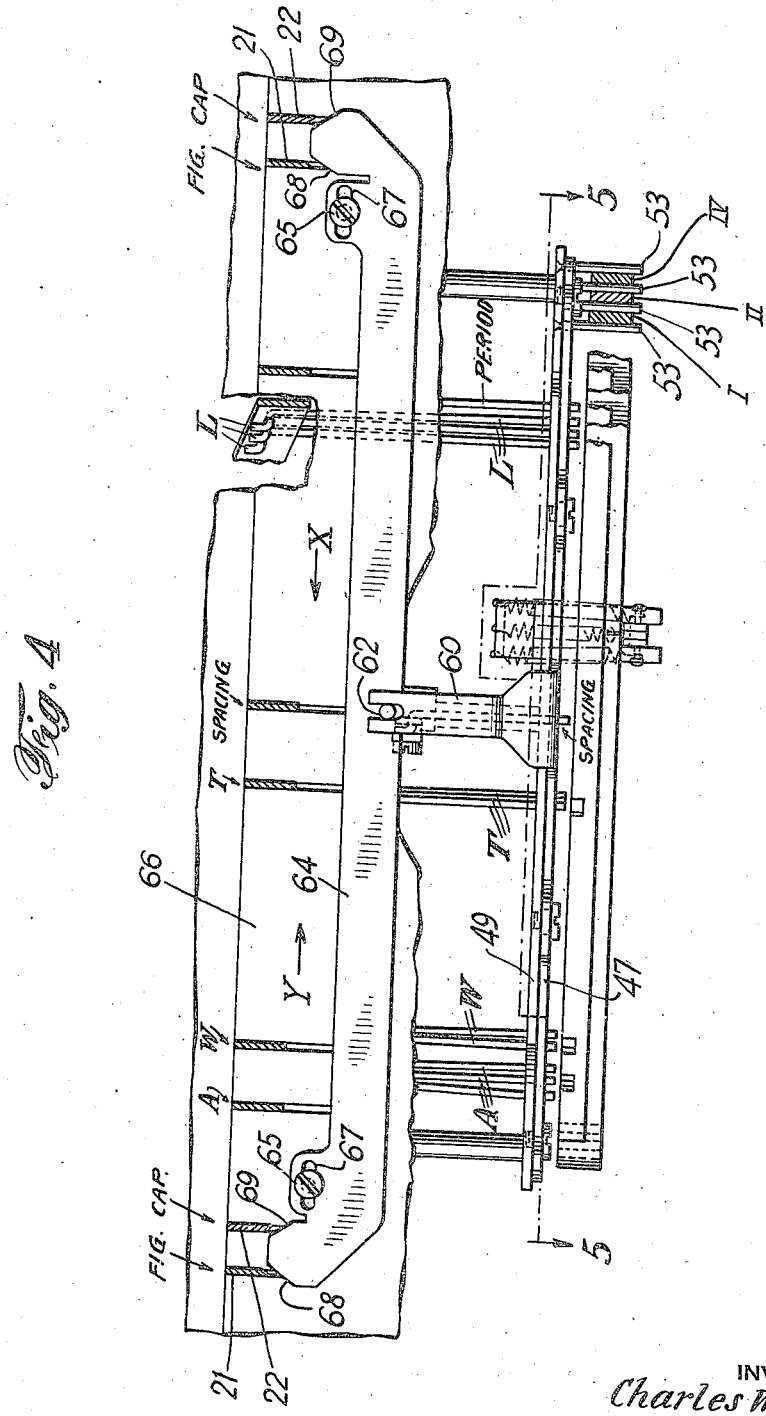
Fig. 4 is a detail elevational view taken on the line 4—4 of Fig. 2 and illustrates the mechanism controlled by the shift keys for changing the effect of the type key levers relative to the differential letter spacing mechanism.

The machine herewith illustrated and described is of the key controlled shuttle type, where the printing impression is formed by the impact of a printing hammer which forces the paper against the ribbon and type. The particular machine with which the present embodiment of the invention is illustrated is known in the art as the "Varityper". It comprises a main frame 1 which carries the mechanism of the machine. Type keys 2 (only a few being illustrated) are mounted on a pivot bar 4 (Fig. 3) supported by the main frame 1. These type keys 2 at their front ends carry finger buttons 5 and at the rear ends cooperate with the actuator bars 6 (one of which is shown in Fig. 3) to operate the actuators 7. These actuators 7 swing the shuttle arm 8 (Fig. 1) so that it oscillates the shuttle 9 on an anvil 9a to bring the proper type to the printing point. Stop rods 10 are provided over each type key lever 2 to engage the shuttle arm 8, thereby definitely positioning the proper type at the printing point when a type key is operated. This mechanism is old in the art and will not be described in detail. See patent to Trego No. 1,880,592, October 4, 1932.

Figure 1:
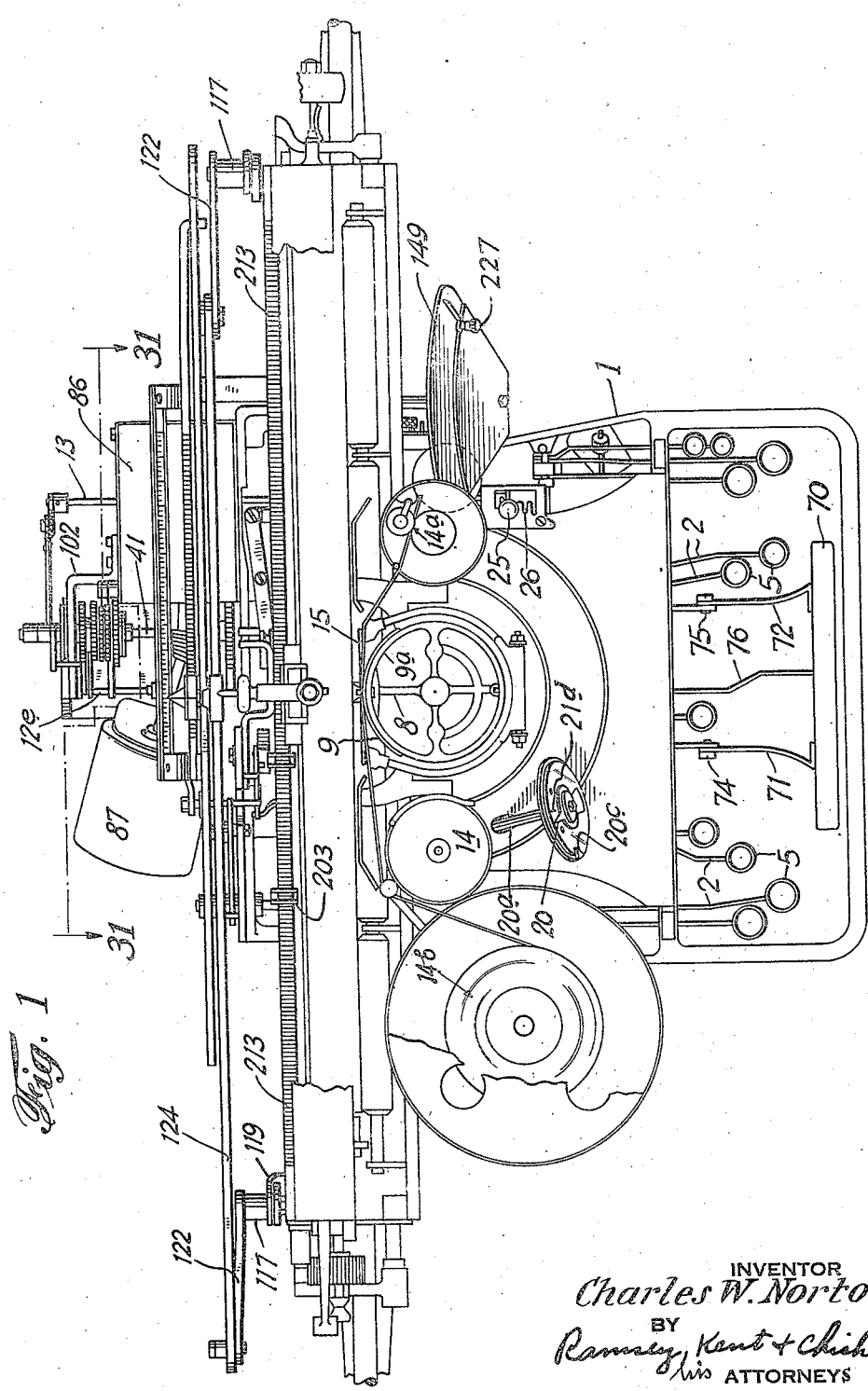
Fig. 1 is a plan view of one form of machine embodying the present invention, and showing a paper strip ribbon feed.

The universal bar 12 (Fig. 3) actuates the ribbon mechanism comprising ribbon spools 14 (Fig. 2), a ribbon guide 15, and other mechanism not illustrated in detail since this construction is also well-known in the art. See patent to Trego No. 1,930,068, October 10, 1933. Fig. 1 illustrates a paper strip ribbon feed 14a and paper ribbon spool 14b.

The paper carriage 16 (Fig. 3) is provided with anti-friction rolls 17 which travel upon the carriage supporting rod 18 as the carriage moves to the left under the influence of the carriage spring. This mechanism is also old and well-known in the art and therefore will not be described in detail.

The carriage 16 is moved in letter space direction by a carriage spring which is mounted in a drum 19 (Fig. 2) that carries a band which is attached to the carriage, as is very well-known in the art. The drum 19 is provided with a bevel gear 19a which meshes with a bevel pinion 19b that is secured to the shaft 20a (Fig. 48, Sheet 3) to rotate this shaft 20a when the drum 19 turns as the carriage is moved. The shaft 20a carries a pointer 20 that is mounted between friction discs 20d and 20e which are held in place by a nut 20f that is threaded on the shaft 20a. The construction is such that the pointer 20 may be set, as hereinafter explained, with reference to the dial 20b. The dial member carries a bezel 20g which has an index point 20c. This bezel 20g is held in place by a friction ring 20h by screws 20i that pass through the dial member, so that the bezel 20g may be set and held in set position for purposes hereinafter explained.

The machine is provided with shift keys 21 (Fig. 2) designated as "Fig." which position certain characters for operation at the printing point, and with shift keys 22 designated as "Cap" which position capital letters at the printing point. This mechanism is also well-known in the art and is described in the patent to Spaloss No. 2,051,112, August 18, 1936.

The structure having to do more especially with the spacing movements of the platen carriage comprises, among other devices, a variable space control mechanism whereby the carriage of the machine may be given its spacings, for different sizes or fonts of type. This mechanism (Figs. 2, 3, 13 and 14) comprises a shaft 24 slidably and rotatably mounted in bearings in the main frame and controlled by a hand lever 25 which is adapted to be engaged in various notches 26 in the index plate 27. The rear end of the shaft 24 carries an arm 28 (Fig. 14) provided with an offset plate 29 adapted to engage a rack lifting and holding dog 30 to cause the dog to engage in the teeth of the rack 31 and lift it, whereby it may be raised from and lowered into engagement with a particular carriage gear wheel 32, 33, 34 or 35 (Figs. 2 and 3) mounted on the escapement shaft. This dog 30 at the same time, by interlocking with the teeth of the rack 31, prevents the carriage from moving while the rack is disengaged from the carriage gear wheels. A lever 36 (Fig. 2) pivoted at 37 on the main frame is connected to one end with a sleeve 38 carried by shaft 24 and at the other end engages a groove 39 in a disc 40 which is secured to the carriage gear wheels 32, 33, 34 and 35. This group, namely, the grooved disc 40 and the carriage gear wheels 32, 33, 34 and 35, constitutes an integral unit slidably mounted upon the escapement shaft 41 and compelled to rotate therewith by key 42. By moving the hand lever 25 from one notch 26 to another in the index plate 27, the corresponding carriage gear wheel 32, 33, 34 or 35 may be caused to slide on shaft 41 and engage the rack 31, and when this is done the normal basic carriage spacings per inch will be in accordance with the number on the index plate 27. This mechanism is also old and is described in detail in the patent to Trego No. 1,918,299, July 18, 1933.

Differential spacing

The differential letter spacing mechanism may be divided into two general groups, namely, the mechanism for the selection by the type key levers of the proper escapement, and the group of elements comprising the escapement mechanism itself.

Referring now to the selecting mechanism associated with the type keys (Fig. 17) it will be observed that each type key lever is provided with depending rods, and in most cases there are three of these rods, associated with each type key. The rods will be designated I—a, II—a, and IV—a. There are three universal bars located beneath the lower ends of these push rods, and the universal bars are designated I—b, II—b, and IV—b. These universal bars are notched on their upper surfaces with notches 44, 45 and 46 respectively, the notches constituting inoperative regions. The push rods I—a, II—a and IV—a all pass through a movable rod plate 47 (Figs. 2 to 5).

Figure 5:
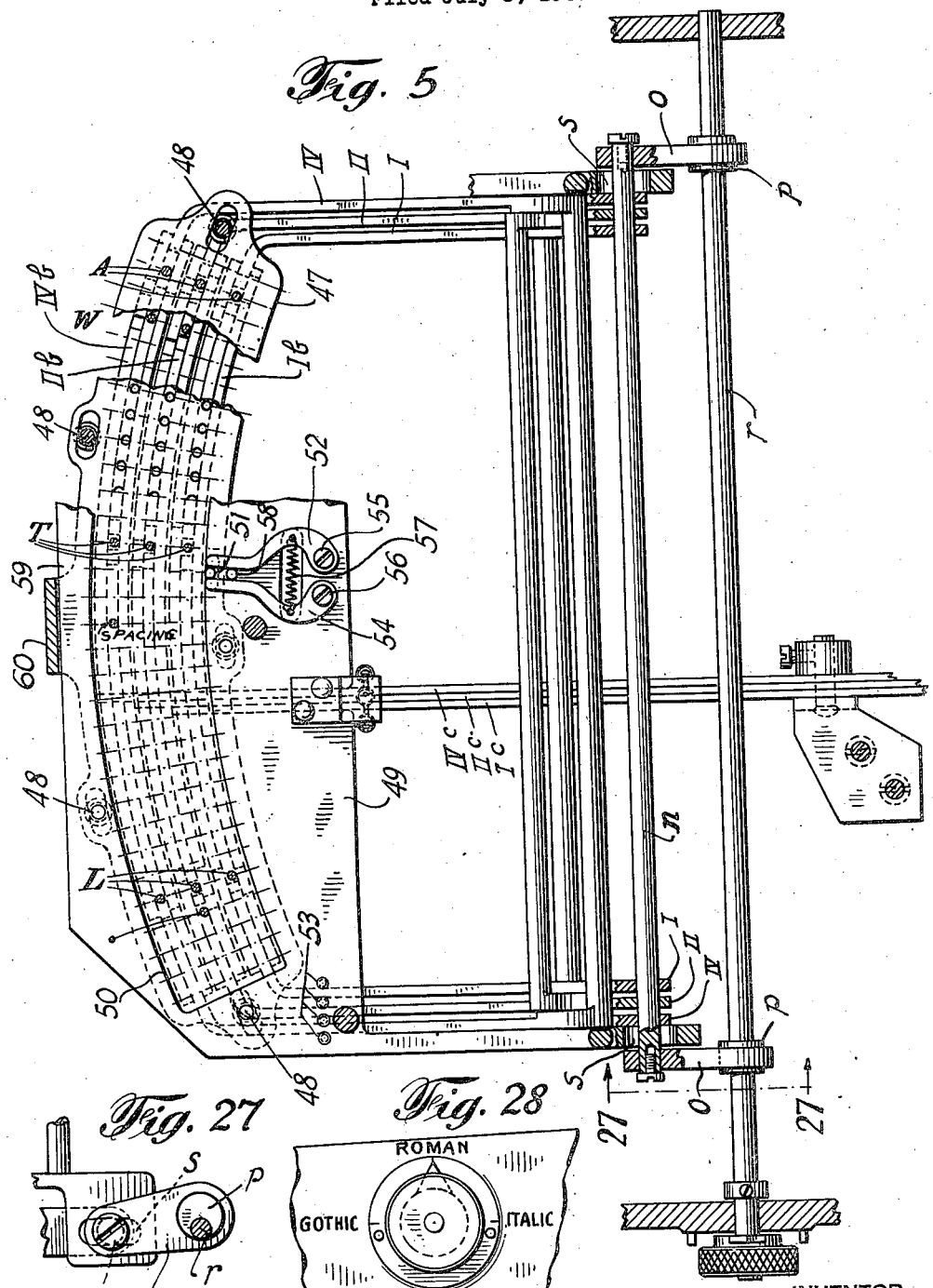
Fig. 5 is a plan view with details in section on the line 5—5 of Fig. 4 and illustrates the relation of the key push rods to the universal bars that control the letter spacing.

As shown in Fig. 5, this rod plate is slidable in an arc over the universal bars I—b, II—b and IV—b for a short distance due to the mounting of the plate 47 upon stud screws 48 secured to the top of the plate 49. Plate 49 is fixedly mounted in the machine frame and is provided with an arcuate opening 50 through which the push rods extend. The rod plate 47 is provided with an upstanding pin 51 which rests between the ends of the spring arms 52 and 54 pivoted at 55 and 56 to the top plate 49. These arms are normally pulled together by the tension spring 57, thus causing the arms to bear against the stationary pin 58 mounted in the top plate 49 and normally alining the upstanding pin 51 on the rod plate 47 with the stationary pin 58, thereby centering the rod plate 47 in central position, but allowing a movement thereof either to the right or to the left of the central position and permitting the arm which has been moved away from the stationary pin 58 to urge the rod plate toward normal position.

The rod plate 47 is provided with a forward extension 59 (Figs. 4 and 5) that carries an upwardly extending forked bracket 60. Bracket 60 extends on each side of a pin 62 (Fig. 4) carried by a shift bar 64 slidably mounted upon stud screws 65 secured to the key comb 66. The stud screws 65 extend through slots 67 in the shift bar 64. The ends of the shift bar are provided with cam surfaces 68 that cooperate with the "Fig." shift keys 21, and also with cam surfaces 69 that cooperate with the "Cap" shift keys 22. It will be observed that when the "Cap" shift keys 22 are depressed the shift key levers cooperate with the cam surfaces 69 and move the shift bar 64 in the direction of the arrow X, namely, to the left; and this shifts the rod plate 47 to the left. This moves all of the lower ends of the push rods I—a, II—a and IV—a to the left. It will be noted that when the "Fig." shift keys 21 are depressed the shift key levers cooperate with the cam surface 68 and cam the shift bar 64 in the direction of the arrow Y, namely, to the right, thereby shifting the rod plate 47 and the lower ends of the push rods to the right. The normal position of the rod plate 47 and the shift bar 64, as previously stated, is in the centralized position.

Referring now to Figs. 17 to 22, which illustrate the settings to type roman letters, it will be noted that if the type lever "L" is depressed with the push rods in the position shown in Fig. 17, the push rod I—a will depress the universal bar I—b and the push rod II—a will depress universal bar II—b, while push rod IV—a will descend in notch 44 in universal bar IV—b without actuating it. Thus, when the type lever "L" is depressed without the use of either shift key, the universal bars I—b and II—b are actuated.

Referring to Fig. 19, which illustrates the push rods connected with the "A" key, it will be observed that when the lower case letter "a" is typed, the push rod I—a depresses the universal bar I—b, and the push rod IV—a depresses the universal bar IV—b. The dotted lines (Fig. 19) representing the push rods to the right of the full line drawing thereof show the position of the push rods when the "Fig." shift keys 21 are depressed, and it will be observed that the push rod II—a is in position to depress the universal bar II—b, when the type key is now depressed, while the push rods I—a and IV—a will descend in notches 46a and 44 respectively. The dotted line representation of the push rods to the left of the solid line drawing illustrates the position of these push rods when the "Cap" shift keys 22 are depressed, and it will be observed that the push rods II—a and IV—a are in a position to actuate the universal bars II—b and IV—b when the type key lever "A" is depressed while the push rod I—a will descend into the notch 46 of the universal bar I—b without actuating the same.

Referring to Fig. 20 which represents the relation of the push rods to the universal bars as to the "W" key, it will be observed that normally the push rods I—a, II—a and IV—a are in a position to depress the universal bars I—b, II—b and IV—b. This same relation is maintained when the "Cap" shift keys 22 are depressed; but when the "Fig." shift keys 21 are depressed then only the push rod IV—a is effective, since the push rod I—a will descend into notch 46 and push rod II—a will descend in the notch 45 in the universal bar II—b.

Fig. 21 represents the push rods carried by the "T" key, and in this case normally universal bars I—b and II—b will be depressed when the type key lever is depressed. The IV—a push rod will descend into the notch 44 in the IV—b universal bar. When the "Cap" shift keys 22 are effective universal bars II—b and IV—b are depressed; and when the "Fig." shift keys are effective only the IV—b universal bar will be depressed.

Referring to Fig. 22, which represents the spacing key, it will be observed that only one push rod 81 is provided and this push rod is always effective on the IV—b universal bar regardless of the use of either of the shift keys 21 or the shift keys 22.

By reference to Fig. 18 representing the "period" type key, it will be observed that only one push rod II—a is attached to this key and that this push rod is always effective on the universal bar II—b regardless of the use of the shift keys 21 and 22.

Figure 2:
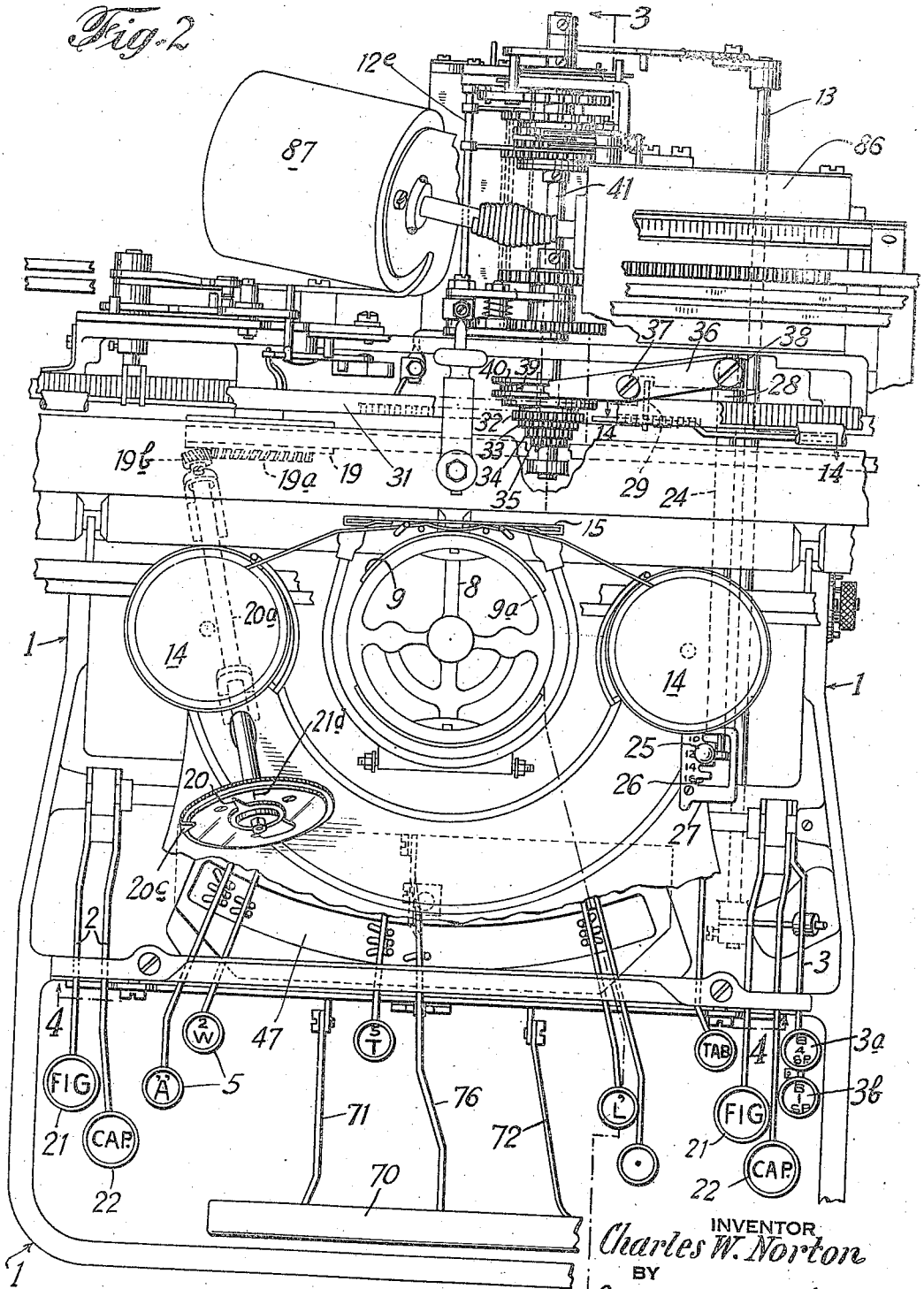
Fig. 2 is a plan view of a preferred form of typewriting machine with such parts omitted as are well known in the art and may not be necessary to a complete understanding of the present invention, and showing a fabric ribbon feed.

The space bar 70 (Figs. 1, 2 and 3) is provided with arms 71 and 72 which are pivoted at 74 and 75 to the main frame, and the mid-portion of the space bar 70 connects with a lever 76 (Figs. 2 and 3). This lever 76 is pivoted at 77 and the rear end is connected by a link 78 to a rocking lever 79 pivoted at 80 in the main frame. The forward end of the rocking lever 79 carries the push rod 81 which, as previously explained, cooperates with the IV—b universal bar. A tension spring 82 connects the forward end of the rocking lever 79 with the space lever 76 near the pivot point thereof, so that the effect of the spring is to maintain the rocking lever 79 in contact with the stop 83 and the space lever at its proper height. The universal bars I—b, II—b and IV—b are guided by guide pins 53 (Fig. 4) and rest upon the forward ends respectively of escapement levers I—c, II—c and IV—c (Fig. 3). These escapement levers are all mounted upon a pivot rod 84 secured to the under portion of the frame 1 of the machine and these levers extend rearward and are connected (Figs. 11 and 15) to escapement links I—d, II—d and IV—d.

The escapement links I—d, II—d and IV—d are connected to the rear end of escapement levers I—c, II—c or IV—c, and are moved upward on depression of the corresponding keys. The escapement link IV—d is adapted to engage lug g on the side of latch lever 106a that cooperates with escapement wheel IV—f to operate this escapement wheel IV—f when the spacing bar 70 is operated. When a letter or character key is depressed the escapement wheel IV—f is released in the same manner as the other escapement wheels, as hereinafter described.

Figure 6:
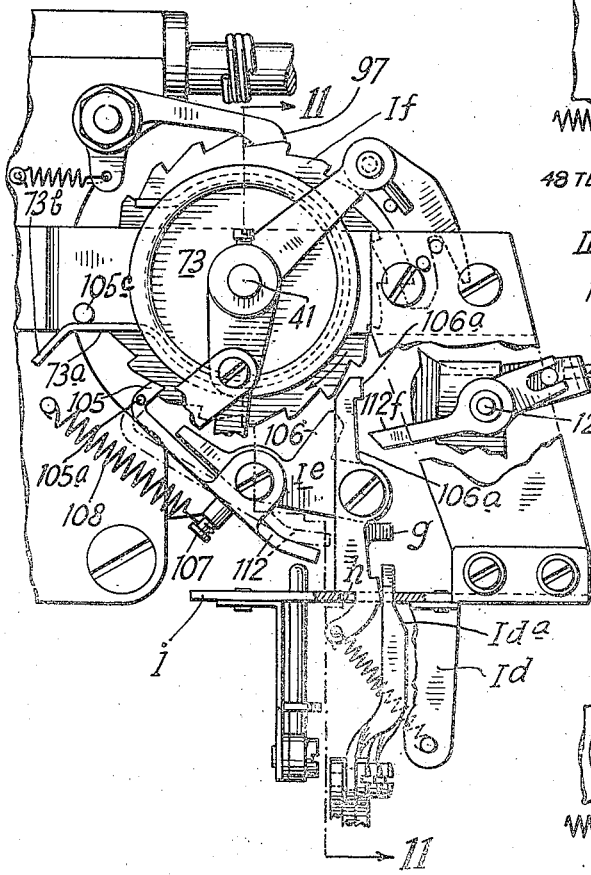
Fig. 6 is a view looking at the end of the escapement shaft from the rear of the machine and shows the escapement wheel 1—f which permits the carriage to escape one unit. The escapement dogs are shown in normal position when the carriage is stationary.

Escapement links I—d, II—d and IV—d are guided in their upward movement by openings h in plate i through which they pass (Fig. 6). When a universal bar (I—b, II—b and IV—b) is depressed, the rear end of its respective escapement lever (I—e, II—e and IV—e) is raised (Fig. 15), and this raises the corresponding escapement link (I—d, II—d and IV—d) see Fig. 15, and Fig. 6. The cam surfaces I—da (only one of which is shown in Fig. 6; it being understood that each of the links I—d, II—d and IV—d have identical such cam surfaces) on the escapement link engages the end of the slot h in the plate i and this operation swings the lever 106a in a clockwise direction to cause the hooked upper end to be engaged over the trip lever 112f. This is a pre-setting operation. At the same time the depressed key lever raises the universal bar 12 (Fig. 3 and Fig. 15) which operates the hammer escapement lever 12b which releases the hammer, and also turns shaft 12e (Fig. 6, Fig. 15, and Fig. 16). The turning of the shaft 12e swings the trip lever 112f clockwise and raises the lever 106a that has been swung into the path of the trip lever 112f, which in turn swings the dog 106 counterclockwise to operate the escapement. The timing is such as to operate the escapement at the same instant the hammer is released.

Each escapement dog I—e, II—e and IV—e comprises two members, a movable dog 105 and a fixed dog 106. Movable dogs 105 are provided with pins 107 with which tension springs 108 are connected to normally hold the movable dogs in engagement with their respective escapement wheels.

Figure 7:
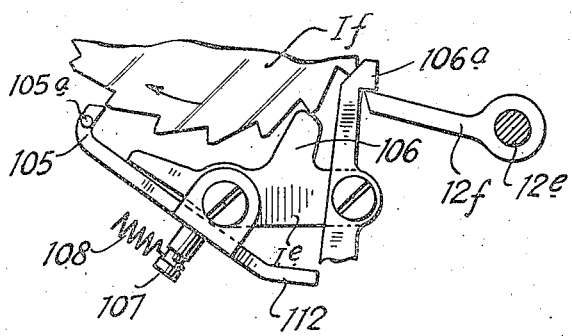
Fig. 7 is a detailed view of the escapement dog and a portion of one of the escapement wheels when a type key has been depressed, and shows the detent disengaged from the teeth of the escapement wheel.

When the dog 105 is being released, the fixed dog 106, however, is in the path of an on-coming tooth of the escapement wheel before that wheel is entirely free from the movable dog 105, and the relation between the fixed dog 106 and the movable dog 105 is such as to permit a very slight movement of the escapement wheel after the movable dog 105 has been disengaged and before the escapement wheel is stopped by the fixed dog 106 (Fig. 7). When the fixed dog 106 releases the escapement wheel, it is reengaged by the movable dog 105 and the escapement wheel has turned one tooth.

Escapement wheels II—f and IV—f are each provided with actuating mechanism similar to that of escapement wheel I—f. The purpose of this mechanism is to prepare the escapement wheels after each key stroke for the next advancement of the carriage while guarding against any advance until after the type impression has been made. This is accomplished by the locking arm 12b, as will be explained hereafter.

Figure 9:
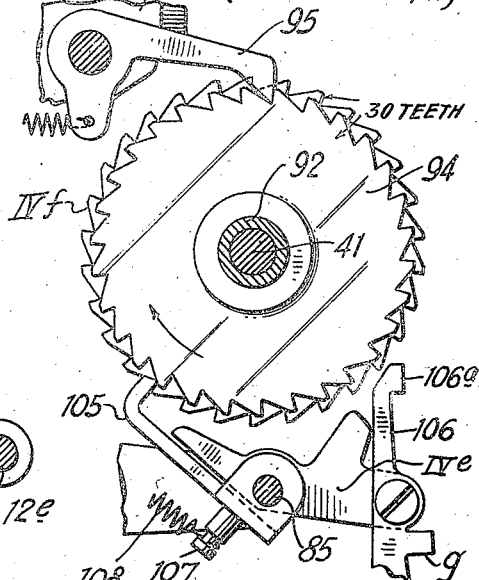
Fig. 9 is a view taken on the line 9—9 of Fig. 11 and illustrates in the foreground a ratchet wheel for normally preventing backward rotation of escapement wheel IV—f when the carriage is returned. The escapement IV—f allows a carriage movement of four units when a key is depressed.

Referring to Fig. 11, it will be observed that the escapement shaft 41 is provided with a disc 88 which is fixedly mounted on the shaft 41. The disc 88 carries three planetary gears 89 which are mounted to rotate on axles 90 that are riveted to the disc 88. These planetary gears 89 mesh at their inner peripheries with the sun gear 91 comprising a portion of a tubular member 92 rotatably mounted on shaft 41. The escapement IV—f is a shell-like member mounted to rotate on the tubular member 92 and is provided with an internal annular gear 93 which meshes with the outer peripheries of the planetary gears 89. This escapement wheel IV—f is also provided with a ratchet wheel 94 (Fig. 9) having the teeth thereof extending in the opposite direction from the escapement teeth to prevent rearward rotation thereof during return movement.

Figure 8:
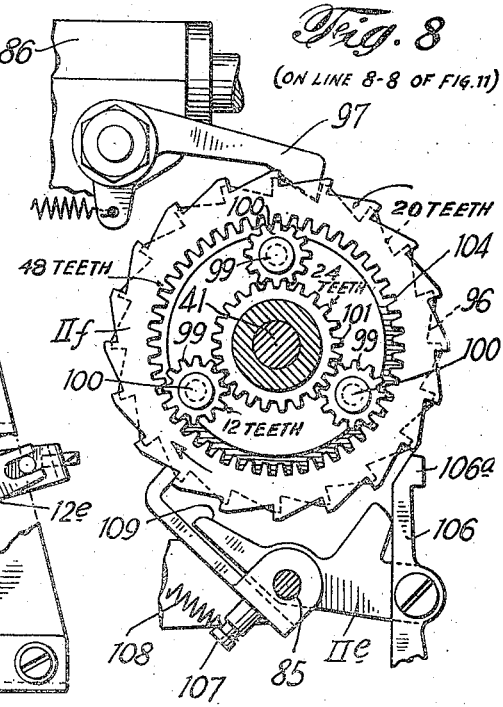
Fig. 8 is a sectional view on the line 8—8 of Fig. 11 and illustrates the escapement wheel II—f and its connected gearing, with the escapement dogs thereof in normal position with the carriage stationary. This escapement wheel permits the carriage a movement of two units when a key is depressed.

The escapement wheel II—f (Figs. 8 and 11) is also mounted for rotation upon the tubular member 92 and is provided with a ratchet wheel 96 with which the dog 97 cooperates to prevent backward rotation of the escapement wheel II—f during carriage return movement. A circular plate 98 is fixedly mounted on the rear end of the tubular member 92. Planetary gears 99 are mounted to rotate upon the axles 100 that are riveted to the circular plate 98. These planetary gears 99 cooperate with a sun gear 101 that is integral with the escapement wheel I—f which is mounted for rotation upon the escapement shaft 41 and is retained in position thereon by a journal bracket 102 carried by the gear box 86 (Fig. 1). These planetary gears 99 (Fig. 8) at their outer peripheries are in mesh with an internal annular gear 104 that is integral with the escapement wheel II—f.

The differential spacing mechanism is constructed to operate through permutations and combinations of a plurality of escapement mechanisms operating on predetermined arbitrary units; for example, the operation of escapement I—f will permit carriage movement of one unit; escapement II—f will allow the carriage to move two units; and escapement IV—f will permit a movement of four units. Thus, by simultaneously operating escapements I—f and II—f, three units of carriage movements are obtained; by operating simultaneously escapements I—f and IV—f, five units of movements are obtained, and by simultaneously operating all escapements, seven units of movement are obtained. It therefore follows that the present differential escapement will accommodate or permit carriage movements from one unit up to seven units. These differential values may all, as a matter of arbitrary designation be associated with normal carriage travel, which may be ten, twelve, fourteen, sixteen or other normal carriage spaces per inch.

The mechanism operates in the following manner: The carriage spring imposes a torque on the drive shaft 41 through one of the gears 32, 33, 34 or 35 in engagement with the rack 31. This turning movement of shaft 41 is resisted by the movable dogs 105 which prevent the escapement wheels from rotating. The turning moment is transmitted from the shaft 41 initially to the disc 88 which carries the planetary gears 89. The outer peripheries of these planetary gears 89 impose a turning moment on the internal annular gear 93 connected with the escapement wheel IV—f. Since this gear is held stationary by its movable dog 105, a turning moment is transmitted to the sun gear 91 on the tubular member 92 through the circular plate 98 to the planetary gears 99. The outer peripheries of these planetary gears 99 engage the internal annular gear 104 connected with the escapement wheel II—f which likewise is held stationary by its movable dog 105; and the sun wheel for the planetary gears 99 imposes a similar turning moment on the escapement wheel I—f which is held by its movable dog 105.

Assume that the escapement dog I—e is actuated to release the movable dog 105, and that the fixed dog 106 is operated to catch and then release the escapement wheel I—f so that the movement of that wheel is transmitted through the planetaries 99 of the circular plate 98, the tubular member 92, the sun gear 91, the planetaries 89 to the disc 88 and thence to the escapement shaft 41; this movement is one unit, and allows one unit of movement to the carriage.

Assuming escapement dog II—e is actuated to allow one tooth of movement to the escapement wheel II—f, the rotative motion will be transmitted through the planetary gears 99 to the circular plate 98, the tubular member 92, the sun gear 91, the planetary gears 89 to the disc 88 and thence to the escapement shaft 41. This angular movement produced by one tooth escapement of the escapement wheel II—f is two units, and allows two units of movement to the carriage.

Assuming that the escapement dog IV—e is operated to permit one tooth escapement of the escapement wheel IV—f, the motion is transmitted from the escapement wheel IV—f to the planetary gears 89 and to the disc 88 and thence to the escapement shaft 41. This movement permitted by one tooth escapement of escapement wheel IV—f is four units, and allows four units of movement to the carriage.

If escapements I—f and II—f are simultaneously operated, the result is the sum of one unit and two units, namely, a total carriage movement of three units. If escapement wheels I—f and IV—f are simultaneously operated, the result is a carriage movement of five units. If escapement wheels II—f and IV—f are simultaneously operated, the total movement of the carriage is six units; and if all the escapements are simultaneously operated, the result is a total carriage movement of seven units.

Escapement wheels I—f and II—f are provided with twenty teeth on their peripheries. Escapement wheel IV—f is provided with thirty teeth on its periphery. The sun gears 91 and 101 each have twenty-four teeth. The annular gears 93 and 104 each have forty-eight teeth, and the gears of both sets of planetary gears 89 and 99 have twelve teeth on each gear.

The ratchet wheel 94 on the escapement wheel IV—f is provided with thirty teeth. The ratchet wheel 96 on the escapement wheel II—f has twenty teeth. The purpose of the ratchet wheels 94 and 96 and their respective holding dogs 95 and 97 is to hold the escapement wheels II—f and IV—f stationary during a carriage return. The reason for this is that by permitting only the escapement wheel I—f to turn backward when the carriage is returned the operator is assured that the carriage will always be returned to the same point, so that the starting points of each line in a column of lines will all be in a true vertical line. This might or might not be the case if all the escapements were permitted to rotate backwards when the carriage is returned.

The hammer mechanism for driving the paper and the printing ribbon against the printing type positioned at the printing point to cause a printing impression to be made is illustrated in Figs. 15 and 16 and comprises a construction the same as that shown in Trego Patent No. 1,965,677, July 10, 1934. The universal bar 12 previously referred to not only operates the ribbon mechanism but also trips the hammer release on the down stroke of a type key, and the carriage escapement is completed on the upstroke of such key.

To guard against movement of the carriage until after the type impression has been completed, latching mechanism is provided to prevent release of the escapement wheels until the upstroke of the key. Referring to Fig. 15, observe that the down stroke of a key will lift the front end of bar 12. This will cause depression of the end 12a of the lever connected to the universal arm, actuating the hammer escapement member 12b. This member 12b carries a pin 12c which engages a slot in the arm 12d secured to shaft 12e journaled in the frame of the machine. Shaft 12e (Figs. 6 and 7) carries an arm 12f for the latch 106a on each of the escapement dogs I—e, II—e and IV—e, each of which arms engages its corresponding latch 106a at the same instant that escapement member 12b releases the hammer for its stroke. This engagement with latch 106a continues until the return movement of the hammer escapement member, which return movement occasions a resetting of the hammer.

One of the objects of the invention is to provide a machine of the type described which will readily permit the use of styles of type which do not all have the same system of letter spacing, such, for instance, as roman, gothic, and italic. Referring to Figs. 17 to 22, it will be observed that each universal bar I—b, II—b and IV—b consits of a number of separate strips, three in this instance, secured together side by side by rivets or otherwise, with their upper edges in a common plane. Any other number of strips could be so joined, according to the number of different systems of letter spacing that might be required. In Figs. 17 to 22 the middle strips of the universal bars are designed for use with roman characters or other characters having the same system of letter spaces. The left-hand strips of the universal bars are adapted for use with italic characters. The right-hand strips are intended for use with gothic characters. This will be more easily understood by reference to Figs. 24, 25 and 26. As shown, when it is desired to use the machine with roman type the universal bars are so adjusted that the push rods from the several keys cooperate with the middle strips. If it is desired to use gothic type, the bars are adjusted so that the character push rods cooperate with the right-hand strips, viewing from the left of the diagram. If it is desired to use italic type, the universal bars are so adjusted that the character push rods cooperate with the left-hand strips. Thus each of the several strips which are secured together to constitute the universal bars I—b, II—b and IV—b constitutes a control zone; there being thus provided in each universal bar a strip or control zone for each contemplated style of type.

The dark rectangles in the diagram represent notches or recesses in the universal bars. If a given push rod coincides with a recess, it has no effect on the universal bar; but the push rod will actuate the universal bar if it does not coincide with a recess.

In order to adapt the spacing to a particular style of type the universal bars as a group are shifted laterally so that either the central strips or the right-hand or the left-hand strips are brought into operative relation to the key push rods. The means by which this is done is shown in Figs. 5, 27 and 28. The universal bars I—b, II—b and IV—b are connected at their ends by strips I, II and IV with a rod n, shiftable in slots s in the frame of the machine; which rod n is shifted by links o cooperating with eccentrics p fixed on shaft r, as clearly shown in Fig. 27. Thus by rotating the shaft r as indicated in Fig. 28 so that the pointer indicates roman, gothic or italic, the universal bars are shifted laterally under plate 47 into position for proper spacing for the system selected.

Figure 26:
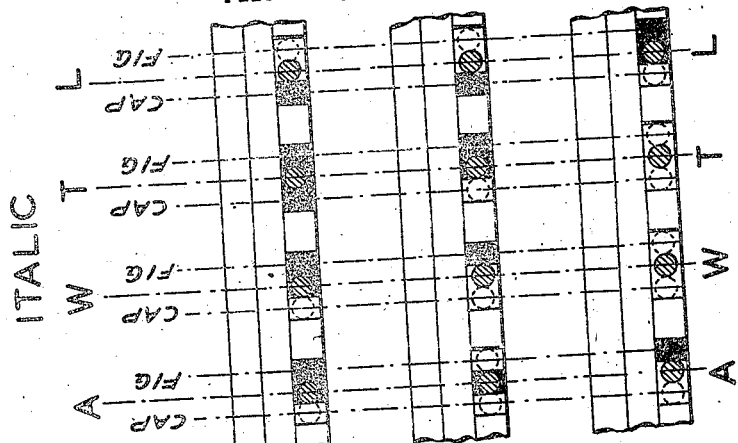
Figs. 24, 25 and 26 are diagrammatic showings of the relative positions of the three universal bars to adapt the escapement mechanism to the use of type of the roman, gothic and italic styles, and also showing the units of escapement allowed to the letters "A," "W," "T" and "L" in the several styles.
Figure 25:
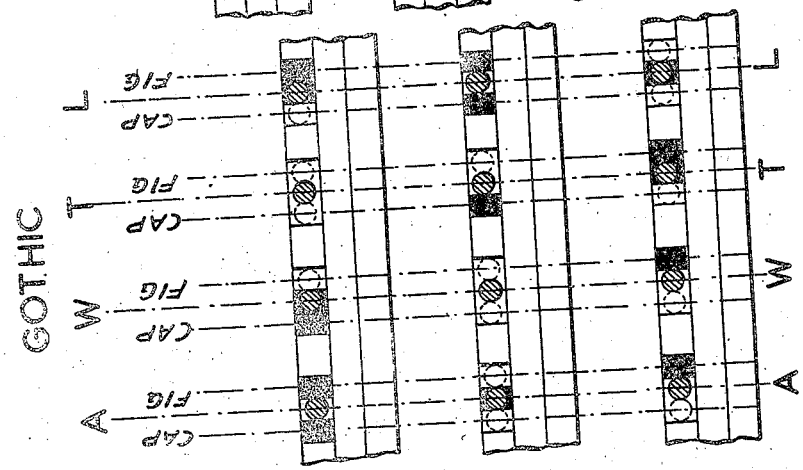
Figure 24:
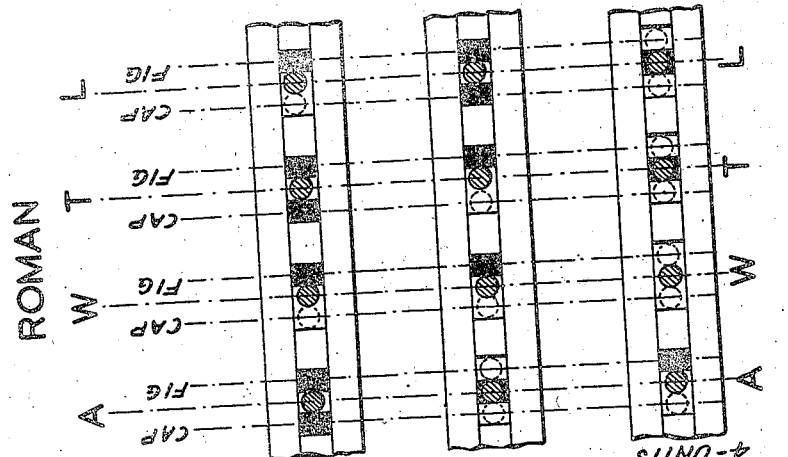

Referring now to Figs. 24, 25 and 26, it will be observed that the spacing units for the letters a, w, t and l are as follows:

|   | Roman | Gothic | Italic |
|---|---|---|---|
| a | 5 | 5 | 4 |
| w | 7 | 6 | 6 |
| t | 3 | 3 | 4 |
| l | 3 | 2 | 3 |
| A | 6 | 6 | 7 |
| W | 7 | 6 | 7 |
| T | 6 | 5 | 6 |
| L | 5 | 5 | 4 |

It has already been explained that the carriage spacing may be adapted to the use of various sizes of type by the shifting of shaft 24 slidably and rotatably adjustable by hand lever 25, to shift one or another of the carriage gear wheels, say 32, into engagement with carriage rack 31. This shifting movement is done when setting up the machine before typing is begun. As the operator types the original unjustified line the carriage so adjusted advances in accordance with the width of the letters, as has been described, and in proportion to the size of the type being used.

*Back spacing*

In a typewriting machine having differential spacing adapted to letters and characters varying in width, as in this invention, it is desirable that provision be made for speedy back spacing, with a final adjustment to the exact spacing required. To meet this need the back-spacing key 3 (Fig. 2) has two buttons, 3a and 3b, one of which operates to back space four units at each stroke, and the other of which operates to back space a single unit on each stroke. (See Figs. 44 to 47.) It is essential in such case that back spacing be free from mechanical error; and the back spacing mechanism is so constructed as to insure exact spacing.

The buttons 3a and 3b are carried by a member pivoted on the key 3. This member is yieldably held in the position shown in Fig. 47 by a tension spring 3f. It has a point or toe 3c, which on downward movement of the key by pressure on button 3a clears the frame 1 and permits the key 3 to move downward until it contacts the adjustable stop 3d. This movement effects a back spacing of four units; and button 3a is marked "Back space 4." If, however, the key is operated by pressure on button 3b the pivoted member which carries the operating buttons is first deflected against the tension of the spring 3f and on downward movement of the key 3 toe 3c takes the dotted line position and contacts frame 1 of the machine, thereby preventing further downward movement. This limited movement is designed to effect only one back spacing unit. The button 3b is therefore marked "Back space 1."

The motion of the back spacing key 3 is communicated to the escapement mechanism by a shaft 13, mounted in the frame 1. This shaft has rigidly secured thereto an arm carrying the roller 13a in contact with extension 3e on the back spacing key. On the rear end of shaft 13 there is rigidly secured an arm 13b, connected by a link 13c with a bell-crank lever 13d freely mounted for oscillation on escapement shaft 41. The arm 13b and link 13c are biased by a spring 13e tending to draw them toward each other, the effect of which is to bias shaft 13 in such manner as to maintain roller 13a in contact with extension 3e on the back spacing key and to bias bell-crank lever 13d toward the position shown in Fig. 44, which is the normal or inactive position of the mechanism.

A pawl 23 is pivoted on a pin 23a, rigidly secured on the bell-crank lever 13d. The pawl 23 is spaced from the bell-crank 13d by a sleeve 23b, as is shown in Fig. 45. It is to be observed that both bell-crank lever 13d and escapement wheel I—f are freely mounted on escapement shaft 41, and that the sleeve 23b serves to position pawl 23 for coaction with the teeth on escapement wheel I—f. To obtain proper engagement between the pawl 23 and the teeth of the escapement wheel I—f, sleeve 23b has a projecting pin 23c which engages pin 23d on pawl 23 and imparts thereto the pressure of spring 23e surrounding sleeve 23b and attached at one end to bell-crank 13d and at the other end to pin 23c, which spring tends to hold the pawl in engagement with the escapement wheel.

In normal or inactive position, however, pawl 23 is out of engagement with escapement wheel I—f; and it is held in this inactive position by a pin 43 secured on the machine frame, which pin engages a notch 43a in pawl 23. In this position escapement wheel I—f, being under the influence of the carriage drive, is controlled in its rotation partly by movable dog 105 and partly by fixed dog 106, as has been explained. Movable dog 105 carries a pin 105a which is engageable by a pin 105b on link 13c when in the position shown in Fig. 46. In that position the extension 13i on bell-crank lever 13d contacts stop pin 63 on the machine frame. The purpose of this contact is to take the principal shock of the back spacing stroke, and thus protect the dog 105 and the pins 105a and 105b as well as the escapement wheel I—f from excessive force and injury.

When the key 3 is given a full stroke so that it contacts the stop pin 3d the back spacing mechanism will take the position shown in Fig. 46, in which pin 105b contacts pin 105a and so holds dog 105 in contact with a tooth of escapement wheel I—f. This will prevent any further backward rotation of the escapement wheel; and the movement is such that the escapement wheel has moved backward a distance equal to four and one half teeth. On the return stroke of the mechanism the dog 105 will permit a forward rotation of the escapement wheel for a distance of one half tooth, when the next tooth will be engaged by dog 105. The resultant backward motion of the full back spacing stroke is a backward movement of four teeth of escapement wheel I—f. This rotation transmitted through the train of escapement gearing results in an angular rotation of shaft 41 which is the equivalent of four spacing units. Obviously a backward movement of one tooth would transmit to shaft 41 a movement of only one unit; and this is the backward movement occasioned by a stroke on button 3b.

It is to be observed that when the back spacing key is released and the pawl 23 returns to its normal position the spring 23e permits the pawl to move outward as it passes over the ratchet teeth; and as it approaches pin 43, notch 43a is in position to engage pin 43. Further return movement of the pawl completely disengages it from the teeth on escapement wheel I—f.

In order to avoid friction and noise on carriage return the escapement mechanism is provided with a construction that lifts the dog 105 of unit escapement wheel I—f at this time. This comprises a grooved wheel 73 around which is a spring wire 73a terminating in a bent end 73b, (Figs. 6, 44, 45 and 46). The grooved wheel 73 is fixedly mounted on shaft 41 and turns counterclockwise on return movement of the carriage. The spring 73a rotates with the wheel 73 until the end of this spring engages pin 105a (Fig. 6 and Fig. 46) and cams outwardly the pin 105a carried on the dog 105, thus removing the dog 105 from engagement with the escapement wheel I—f. When the carriage moves in letter space direction the spring 73a engages the fixed pin 105c and this tends to open the spring around grooved wheel 73 so that no perceptible friction occurs during letter space travel of the carriage.

Line justification

Reference will be made to Fig. 29 which illustrates diagrammatically the mechanism for accomplishing justification. The carriage 16 is movable for letter space movement from left to right (as viewed from the rear of the machine, in the direction of the arrow X. This carriage carries a pair of bell-cranks 117, the horizontal arms 122 of which are connected by a control bar 124 and the vertical arms 119 of which are connected to an escapement rack 31. The control bar 124 is provided with a roller 138 that travels upon a track-bar 125 in a direction parallel to the movement of the carriage 16.

Figure 33:
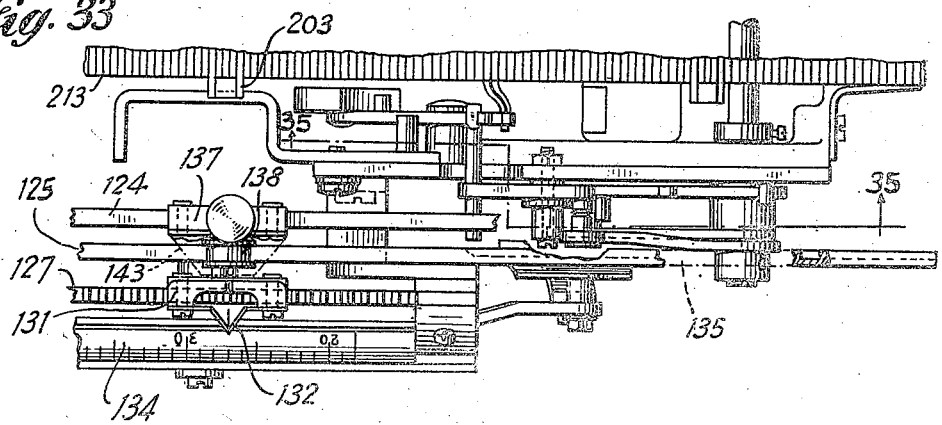
Fig. 33 is a plan view illustrating details of mechanism for setting the justification sine bar.
Figure 34:
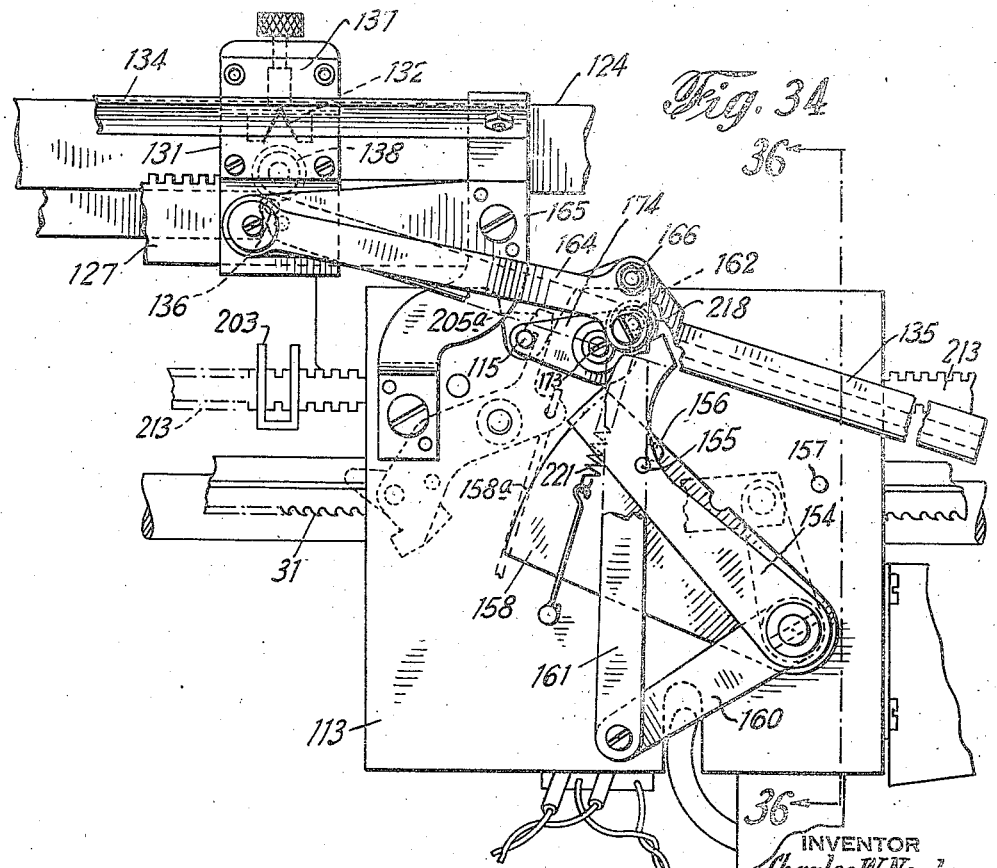
Fig. 34 is an elevational view of the mechanism shown in Fig. 33.

Track-bar 125 (Fig. 30) is slidably mounted for adjustment with one end extending through a slot in a right angle end 126 of the notched bar 127 that is fixedly mounted by suitable bracket 128 on the machine frame 1. The other end of the track-bar 125 is carried by a rivet 130 (Fig. 30) which extends from an adjustment sleeve 131 (Figs. 33 and 34). Adjustment sleeve 131 is provided with a pointer 132 that cooperates with a scale 134. It is also provided with a suitable dog (not shown) which cooperates with the notched bar 127 to permit the track-bar 125 to be set in adjusted positions relative to the scale 134 for the purpose of adjustment to the column width.

A sine-bar 135 is pivoted at 136 to the sleeve 131 directly opposite to the pointer 132 so that the setting of the pointer 132 relative to the scale 134 indicates the position of the axis of the pivot 136 relatively to the scale 134. Adjustment clamp sleeve 137 is mounted for slidable adjustment on the control bar 124 and carries a roller 138 (Figs. 33 and 34) which rides upon the upper edge of the track-bar 125 and the sine-bar 135. The adjustable setting of sleeve 137 on the control bar 124 determines the position of the left-hand margin of the justified column relatively to the paper carriage, and to this end the clamp sleeve 137 is adjusted opposite to the pointer 132 on the adjustment sleeve 131 as shown in Figs. 33 and 34.

The sine-bar 135 may be swung in a vertical direction around the pivot 136 to various degrees of inclination. It will be observed that as the roller 138 travels down the sine-bar 135, when the carriage escapes from left to right (as viewed from the back of the machine), the control bar 124 is gradually lowered, and as the control bar is lowered the carriage is advanced a slight increment in addition to the normal character space each time a character is typed or a space is provided between the words.

When an unjustified line is being written the roller 138 is travelling on the horizontal track-bar 125. A signal is given when the end of the written line is being approached. The operator may type a few characters after the signal to complete the unjustified line. When the signal is given, an operating dog 141 on the justifying bar 142 (Figs. 29 and 30) has engaged a block 144 on the operating bar 145 which is slidably mounted in the machine frame 1. One end of the operating bar carries a rack 146 which cooperates with a gear segment 147 to swing the pointer 148 over the indicator scale 149. The other end of the operating bar is connected by a link 150 with a crank arm 151 which is fixedly mounted on a shaft 152 that is rotatably mounted in the machine frame 1. The rear end of this shaft 152 has an upwardly extending arm 154 fixedly mounted thereon. This arm 154 is provided with a pin 155 (Figs. 30, 34 and 38) which is adapted to contact with a pin 156 on lock arm 158. Thus, as the carriage moves with the dog 141 in contact with the block 144 (to write a few characters after the signal), the shaft 152 is rotated, and actuates the adjustment or setting mechanism which positions the sine-bar so that such extension of the unjustified line will be made as will exactly justify the line when it is rewritten.

Figure 36:
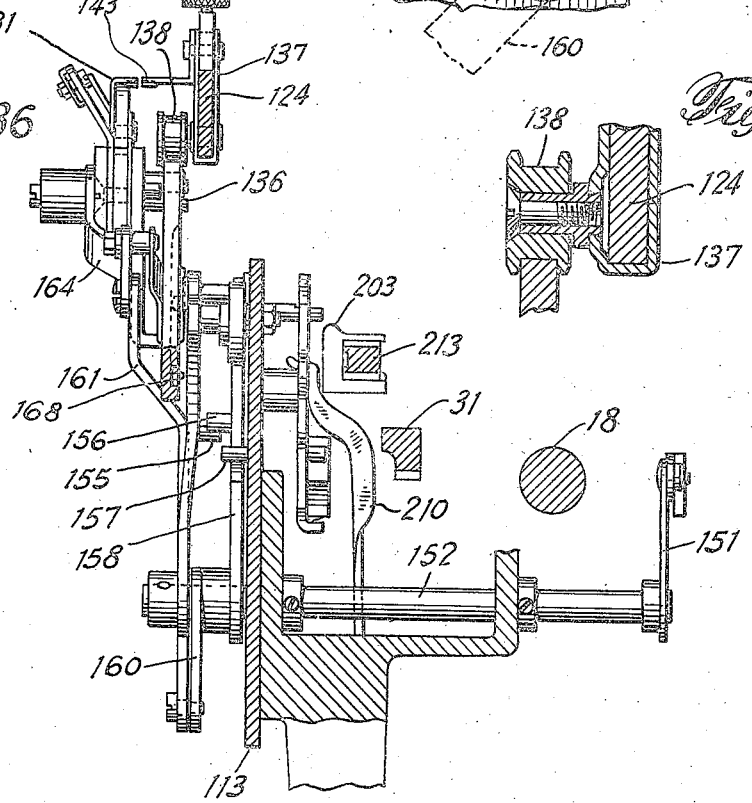
Fig. 36 is a sectional view illustrating the sine bar holding mechanism taken on line 36—36 of Fig. 34.

It should be observed that the sine-bar lock arm 158 is itself in some respects a new device necessary for the organization of the present invention. The analogous element of the invention disclosed in my Patent No. 2,263,642 is suited to uniform carriage spacing; but when the carriage spacing is not uniform for each key stroke as in this invention the sine-bar cannot attain correct justification by uniform steps, but must be advanced at each key stroke a distance proportionate to the carriage advance occasioned by that stroke. To meet that requirement, and other necessities, the sine-bar lock is of special design. This sine-bar lock comprises a lock arm 158 rigidly attached to a sleeve 159 rotatable upon the shaft 152, and this sleeve carries an arm 160 which is connected by a link 161 with a guide sleeve 162 through which the sine-bar is slidably movable. When the adjustable sleeve 131 is moved relatively to the scale 134, this guide sleeve 162 is held in position on the sine-bar 135 by an oscillating link 164 (Figs. 34, 36, and 38) that is pivoted to a bracket 165 secured to the main frame. Link 164 is also pivoted at its forward end at 166 to the guide sleeve 162. By this construction the oscillating link 164 retains the guide sleeve 162 in its proper position, so that when the link 161 attached to 164 at 167 is raised or lowered, it correspondingly raises or lowers the sine-bar. The sine-bar 135 is provided with a groove 168 in which a guide pin 168a is slidable (Fig. 43).

During the typing of the unjustified line, after the signal bell rings, each step-by-step movement of the escapement rack of the carriage, through the connections described, raises the free end of the sine-bar in the direction of the arrow J (Fig. 29). The limit of movement of the sine-bar is reached when the sine-bar becomes aligned with the track-bar 125; which means that it takes that position when all the letters possible have been written in the unjustified line. In other words, the unjustified line in such case has reached the length of the standard justified line and no expansion thereof is needed. When the sine-bar 135 has been raised to this limit, arm 158 contacts stop pin 157, which prevents further movement. Ordinarily, however, the unjustified line is less than the full length, and as a result the sine-bar more often is lifted less than the full limit of movement; but whatever position it reaches it must be locked in that position while the justified line is being written, and special mechanism is provided to that end.

Figure 35:
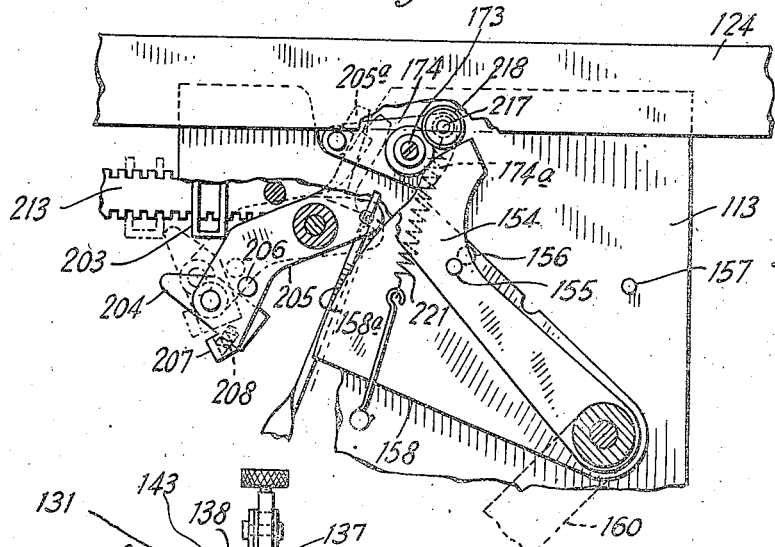
Fig. 35 is a detail view of a holding mechanism for the sine bar shown on line 35—35 of Fig. 33.
Figure 37:
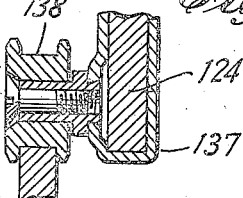
Fig. 37 is a detail view of the roller on the control bar.

It will be observed that dog 174 (Figs. 29, 34 and 38) is pivoted on plate 113 (attached to main frame 1) and serves to lock the arm 158, in the position to which it has been moved, by the eccentric curved surface 174a (Fig. 38) bearing against the cylindrical surface 158a on the end of arm 158 because of force of the spring 221 producing a sort of toggle action when the latch finger 205a has been released from pin 115. On the return movement of arm 154 that arm contacts roller 218 and, lifting it, disengages dog 174a from the arm 158. It will also be observed that the lifting of roller 218 lowers pin 115, on the opposite end of dog 174, and that pin 115 again becomes engaged by latching finger 205a on a pivoted dog 205, to be hereafter described. (See Figs. 34, 35 and 38.) The purpose of this is to permit free movement of arm 158 except when necessary to lock the sine-bar setting preparatory to rewriting the line for justification. Dog 174 is biased toward contact with arm 158 by the tension of spring 221, (Figs. 34 and 35).

Since the locking of the sine-bar 135 in its adjusted position is brought about by the friction cam surface 174a, on the dog 174, engaging the friction cylindrical surface 158a, on the arm 158, the swinging movement of this arm 158 may be locked in any position within the scope of engagement of the two surfaces 158a and 174a. This construction therefore permits of much finer adjustments of the sine-bar 135 than could be obtained by pawl and ratchet lock. Such a friction lock is particularly desirable where the machine is capable of so many letter spacing controls as are provided by the present invention.

It sometimes happens that a short line occurs, as at the end of a paragraph, when the operator is writing in the unjustified column. It is desirable that such short lines should be written with normal spacing in the justified column. Since the short line is completed before the signal bell rings, the sine-bar 135 is standing in its lowest position and would introduce maximum justification space if the carriage should be tabulated to the justified column at that time. So, in order to enable the operator to write the short line in the justified column with normal spacing, the pointer 148 is provided with a finger knob 227 (Figs. 29, 30 and 39) whereby the operator may manually move the pointer 148 counterclockwise when viewed from front of machine. This positive movement of the pointer 148 moves the operating bar 145 (Fig. 30) to turn the shaft 152 and through the connected parts to cause the link 161 to raise the sine-bar 135 in exactly the same manner as if these movements were brought about automatically. If the operator moves the pointer 148 counterclockwise to the "o" position on the left of the indicator scale 149 the sine-bar 135 will be horizontal and will constitute a straight line continuation of the track-bar 125 so that any typing in the justified column will be written with normal spacing; that is, with the same spacing that the line had when written in the unjustified column. When the carriage is returned to again permit typing in the unjustified column the parts act to restore the sine-bar to its lowest position exactly the same as if the sine-bar had been raised automatically by operation of the machine instead of having been raised positively by the operator.

Before typing is begun it is desirable to set the machine for the work to be done. This requires determining the length of lines and the position of the columns on the paper carried by the paper carriage. Preferably the dog 141 (Figs. 29, 30 and 41) is set first and this setting is preferably near the center of the scale on the rack bar 142. The dog 141 operates the bell signal (see U. S. Patent 1,963,158, June 19, 1934) and shortly thereafter contacts with the block 144 (Figs. 29 and 30). The setting of this dog 141 therefore indicates the right end of the unjustified full length line. The dog 216 is preferably set next in order. This dog 216 contacts with the block 144 on the return movement of the carriage and moves the operating bar 145 to normal position where the carriage is stopped on its return movement. Thus the setting of the stop 216 determines the position of the left-hand margin of the unjustified lines. The distance on the scale on the rack-bar 142 between stops 141 and 216 is the measure of the length of the unjustified full length lines. The tabulator stop 203 (Figs. 34, 35 and 41) is set on the tabulator bar 213 several units beyond the setting of dog 141 on bar 142. The setting of the tabulator stop 203 determines the left margin for the column of justified lines. The adjustment sleeve 131 is now set relatively to scale 134 as indicated in Fig. 33. The tabulator key 110 is operated and the carriage is stopped by the engagement of stop 203 with the dog 204, (dotted lines Fig. 35). While the carriage stands in this position sleeve 137 (Figs. 33, 34 and 36) is adjusted on the control bar 124 so that indicator 143 (Fig. 36) on sleeve 137 is aligned with pointer 132 on adjustment sleeve 131. The machine is now set for operation. It will be observed that the setting of the adjustment sleeve 131 is along the bar 127 that is fixedly mounted to extend parallel to the travel of the paper carriage 16. When the adjustment sleeve 131 is adjusted along the bar 127 the sine-bar 135 is slid through the guide sleeve 162, and the initial angle of the sine-bar 135 to carriage travel path is changed. This automatically corrects the justification increment for different lengths of lines, for example, if the justified line is two and one-half inches long and one unit is to be distributed throughout this line the setting of the adjustment sleeve 131 at "25" on scale 134 automatically distributes this one unit throughout the total length of the line. If the justified line is four inches long, and one unit is to be distributed, the setting of the adjustment sleeve 131 opposite the "40" on the scale 134 (assuming the other elements and stops are properly set) will set the sine-bar 135 so that one unit will be distributed throughout the four inch justified line. Thus it will be seen that the basic inclination of the sine-bar is automatically changed for each length of line by the setting of the sleeve 131.

Having completed the typing of the unjustified line and thereby having obtained a proper adjustment of the sine-bar, the operator depresses the tabulator key (Figs. 2 and 41). This key is pivoted in the main frame on the pivot block 190 so that when the key is depressed the back end of the lever is raised. A cross lever 191 is pivoted on a bracket 192, which is secured to the main frame, and bears upon the front arm of a bell crank lever 194. The front end of this bell crank lever carries a rod 195 which connects with the block 144 pivoted on a pivot screw 196 (Fig. 42) carried by the operator bar 145. This pivoted block 144 is normally urged against a stop screw 197 by the spring 198. When the tabulator key is depressed the cross lever 191 operating on the forward arm 194 of the bell crank lever pulls down the rod 195 and pulls the block 144 out of engagement with the operating dog 141. Also a cross lever 209 pulls down on a link 210 connected to the swinging arm 205 and lifts the tabulating dog 204 pivoted on arm 205 into the path of the stop 203. This results in moving latching finger 205a out of engagement with pin 115 on dog 174, permitting that member to drop into locking engagement with sine-bar lock arm 158.

A rearwardly extending arm 111 (Fig. 41) is secured to the sleeve 194a that carries the bell crank lever 194 so that when the cross lever 191 depresses the horizontal arm of the bell crank 194 it also rocks the sleeve 194a clockwise and lifts the rear end of the long arm 111; this in turn lifts the front end of the stub lever 111b, through the pin and slot connection 111c. The stub lever raises the push rod 111a which raises the tail 112 of the dog 105 (Fig. 6) and frees the escapement wheel I—f from the dog 105.

The carriage is now free to move under the influence of the carriage drive and tabulates to the position where the stop 203 on the rack 213 engages the tabulating dog 204 (Figs. 35 and 41). The dog 204 may oscillate between the stops 206 and 207 (Fig. 35) which are mounted on the swinging arm 205 and is normally held in engagement with the stop 207 by the coil spring 208. The tabulating stop 203 has been set so that the carriage has moved the roller 138, carried by the control bar 124, to the position shown in Figs. 33 and 34, so that the carriage has moved to the position corresponding to the left-hand margin of the justified column.

Assume, now, that the parts have reached the position shown in Fig. 29 and the unjustified line is completed. The operator pushes the tabulator key 110 which, through rod 195, lowers the block 144 out of the path of the operating dog 141 and releasing the escapement wheel I—f (Fig. 6) permits the carriage to move over to the center line Y, where the roller 138 on the control bar 124 rests on the end of the sine-bar 135. At this point, the dog 174 has been released from finger 205a and so locks the sine-bar lock arm 158 stationary, with the sine-bar 135 locked in the inclined position to which it has been raised.

There is a sequence of events that occurs when the tabulator key is operated. First, latch 205a is released from the pin 115 to permit the lock 174 to lock the lock arm 158 in position, thus locking the sine-bar 135; second, block 144 is pulled down to permit free carriage travel; and third units escapement wheel I—f is released to release the carriage for tabulating movement.

Referring now more especially to Fig. 30, which is a detail view looking from the back of the machine toward the front thereof, this Fig. 30 illustrates carriage frame 16 in which is slidably mounted a rod 212 that is provided with two rearwardly extending arms 214 which carry escapement rack 31 that is in engagement with a pinion 32 which is controlled by the escapement mechanism. The escapement rack 31, therefore, is capable of sliding movement relative to the paper carriage frame, along with the movement of the paper carriage frame (see also Figs. 31, and 32).

Sine-bar 135 is pivoted to the track-bar 125 and forms a continuation thereof so that the roller 138 on control bar 124 travels directly from the horizontal track-bar 125 onto the sine-bar 135. Each movement of the escapement rack 31 produces a corresponding movement of the carriage 16 so long as the roller 138 remains on the horizontal track-bar 125, which is throughout the writing of the unjustified line. As soon as the roller 138 reaches the inclined sine-bar 135, that is, at the beginning of the justified line, the control bar drops downwardly a small increment for each advance movement of the roller along the sine-bar. This dropping down or lowering of the control bar 124 causes a turning of the bell cranks 117 and thereby causes a relative movement between the escapement rack 31 and the carriage 16, so that the advance of the carriage now becomes the advance produced by the escapement plus the increment produced by the rotation of the bell cranks 119; so that when the operator has finished rewriting the matter of the unjustified line, it now becomes a justified line and terminates evenly with the right of the justified column.

Before starting operations, the operator moves the carriage to the right, to the position of the left-end (or margin) of the first line of rough copy. Then the pointer 20, which is frictionally mounted on shaft 20a, is set opposite to the mark 21d (Figs. 1 and 2). Now on the return of the carriage to the left margin position to write a second or succeeding line, the operator observes the relation between the pointer 20 and the line 21d. If they coincide, the operator writes the second or succeeding line. If the pointer 20 and the line 21d do not coincide due to the small increments of letter spacing, the operator either back spaces the carriage or operates the space bar until the pointer 20 and the line 21d are aligned. Then the rough second line may be written.

When the first rough line is completed the operator operates the tabulator and thus positions the carriage for the left margin, or start of the justified line. Before writing this first justified line, the operator turns the bezel 20g to bring the index point 20c into alignment with the end of pointer 20. Then the first justified line is written. Now when the second or any succeeding justified line is to be written the operator observes whether or not the index point 20c is aligned with the pointer 20. If not, the operator uses the back spacer or operates the space bar to make these two pointers come into alignment and when this occurs the justified line may be written.

Without these indicators and proper corrections as explained, the margins of the lines would be irregular and the lines out of vertical alignment at their ends.

Figs. 30, 39 and 43, disclose an indicator 148, which is connected by a rack 146 and pinion 147 with the operating bar 145, thus this indicator swings over the scale 149 when the sine-bar 135 is being set during the writing of the unjustified line. Thus the indicator shows the operator how many letters may be written after the warning bell (common in the art) has rung. In other words, it is the indictor for the right end of the unjustified line and shows the possible maximum limit of length of the line that may be written.

When a line is short, as at the end of a paragraph, the unjustified line may not be long enough to properly set the sine-bar and the justification would be excessive. When this happens the operator uses the knob 227 to move the indicator over the scale 149 which is in the justification zone. This moving of the indicator 148 raises the sine-bar which is now locked in raised position (see Figs. 30 and 43).

After the justified line has been written the operator returns the paper carriage to its righthand position (viewed from the front of the machine) to begin writing a new unjustified line. On this return, dog 216 on the bar 142 engages the block 144 (Fig. 30) and moves the operating bar 145 with the carriage, and rack 146 cooperating with the gear segment 147 swings the pointer 148 to the starting position as shown in full lines in Fig. 39. The movement of the operating bar to the left (Fig. 38) turns the shaft 152 counterclockwise and swings the arm 154 to cause the upper end thereof to engage a roller 218 on the holding dog 174. The upper end of the lever 154 cams roller 218 upward and disengages the dog 174 from the sine-bar latch 158 and again latches pin 115 beneath the latch 205a. The weight of the pivoted sine-bar now causes the bar to drop to its lowest or most inclined position. As the bar drops it swings the arm 158 counterclockwise due to the downward pressure on the link 161 operating through the arm 160 and the sleeve 159. Thus the machine is ready for the next line.

It is to be understood that while the invention is described herein as applicable to a typewriting machine of the kind known as a "Varityper" it is capable of use in its broader aspects with typewriting machines of other kinds, and is not to be understood as limited in its scope other than as indicated in the claims.

I claim:

1. In a typewriting machine, in combination, a movable paper carriage, a variable escapement mechanism to control the movement of said carriage, a plurality of universal bars operatively connected with said escapement mechanism, key levers to operate said escapement mechanism, means between said escapement mechanism and said carriage to change the degree of letter spacing of said carriage according to type size, changeable type means to change the type font in use at the printing point, said universal bars being adapted to vary the system of letter spacing according to the style of the type font in use at the printing point.

2. In a typewriting machine, in combination, a movable paper carriage, a variable escapement mechanism to control the movement of said carriage, a plurality of universal bars operatively connected with said escapement mechanism, key levers to operate said escapement mechanism, means comprising a plurality of different sized gears between said escapement mechanism and said carriage to change the degree of letter spacing of said carriage according to type size, changeable type means to change the type font in use at the printing point, and means to vary the basic letter spacing to accord with the style of the type font in use at the printing point.

3. In a typewriting machine, in combination, a movable paper carriage, a variable escapement mechanism to control the movement of said carriage, a plurality of universal bars operatively connected with said escapement mechanism, key levers to operate said escapement mechanism, means between said escapement mechanism and said carriage to change the degree of letter spacing of said carriage, changeable type means to change the type font in use at the printing point, and means for shifting the universal bars to vary the system of letter spacing in accordance with the style of the type font in use at the printing point.

4. In a typewriting machine, in combination, a movable paper carriage, a variable escapement mechanism to control the movement of said carriage, a plurality of universal bars operatively connected with said escapement mechanism, key levers to operate said escapement mechanism, means comprising a plurality of different sized gears between said escapement mechanism and said carriage to change the degree of letter spacing of said carriage according to type size, changeable type means to change the type font in use at the printing point, said universal bars being adapted to vary the system of letter spacing according to the style of the type font in use at the printing point.

5. In a typewriting machine, in combination, a movable carriage, a variable spacing mechanism for controlling the movement of said carriage, a plurality of universal bars connected with said spacing mechanism and having operative and inoperative regions constituting spacing control means, said regions being arranged in a plurality of control zones each adapted to a particular spacing system, key levers, a plurality of push rods carried by said key levers, means to shift said push rods relative to said regions to determine the effect of said push rods on said universal bars, and means to shift said universal bars relative to said push rods, to bring into position any desired control zones.

6. In a typewriting machine, in combination, a movable carriage, a variable spacing mechanism for controlling the movement of said carriage, a plurality of universal bars connected with said spacing mechanism and having operative and inoperative regions constituting spacing control means, said regions being arranged in a plurality of control zones each adapted to a particular spacing system, key levers, a plurality of push rods carried by said key levers, means to shift said push rods relative to said regions to determine the effect of said push rods on said universal bars, and means to simultaneously shift all of said universal bars relative to said push rods, to bring into position any desired control zone.

7. In a typewriting machine, in combination, a movable carriage, a variable spacing mechanism for controlling the movement of said carriage, a plurality of universal bars connected with said spacing mechanism and having operative and inoperative regions constituting spacing control means, said regions being arranged in a plurality of control zones each adapted to a particular spacing system, key levers, a plurality of push rods carried by said key levers, means to shift said push rods into more than two positions relative to said regions to determine the effect of said push rods on said universal bars, and means to shift said universal bars relative to said push rods, to bring into position any desired control zone.

8. In a typewriting machine, in combination, a movable carriage, a variable spacing mechanism for controlling the movement of said carriage, a plurality of universal bars connected with said spacing mechanism and having operative and inoperative regions constituting spacing control means, said regions being arranged in a plurality of control zones each adapted to a particular spacing system, key levers, a plurality of push rods carried by said key levers, means to shift said push rods into more than two positions relative to said regions to determine the effect of said push rods on said universal bars, and means to simultaneously shift all of said universal bars relative to said push rods, to bring into position any desired control zone.

9. In a typewriting machine, in combination, a movable paper carriage, a variable spacing mechanism for controlling the movement of said carriage, a plurality of universal bars operatively connected with said spacing mechanism and having operative and inoperative regions constituting spacing control means, said regions being arranged in a plurality of control zones each adapted to a particular spacing system, a plurality of key levers, push rods associated with said key levers adapted to selectively actuate said universal bars, a positioning plate for said push rods, a shift key, means for operating said positioning plate by said shift key to change the longitudinal position of said push rods relative to the operative regions of said universal bars, and means for changing the lateral relation between said push rods and said universal bars, to bring into position any desired control zone.

10. In a typewriting machine, in combination, a movable paper carriage, a variable spacing mechanism for controlling the movement of said carriage, a plurality of universal bars operatively connected with said spacing mechanism and having operative and inoperative regions constituting spacing control means, said regions being arranged in a plurality of control zones each adapted to a particular spacing system, each of said universal bars having a plurality of work faces arranged side by side, a plurality of key levers, push rods associated with said key levers adapted to selectively actuate said universal bars, a positioning plate for said push rods, a shift key, means for operating said positioning plate by said shift key to change the longitudinal position of said push rods relative to the operative regions of said universal bars, and means for changing the lateral relation between said push rods and said universal bars, to bring into position any desired control zone.

11. In a typewriting machine, in combination, a carriage escapement mechanism operable to produce variable letter spacing intervals, a type shuttle, a spring actuated printing hammer cooperating with said shuttle, release mechanism for said printing hammer, and a detent operated by said release mechanism for preventing movement of said escapement mechanism until initiation of return movement of each printing hammer.

12. In a typewriting machine, in combination, a carriage escapement mechanism operable to produce variable letter spacing intervals, a type shuttle, a spring actuated printing hammer cooperating with said shuttle to produce a type impression, release mechanism for said printing hammer, and a detent operated by said release mechanism for preventing movement of said escapement mechanism until after the printing impression has been made.

CHARLES W. NORTON.

Certificate of Correction

Patent No. 2,405,974. August 20, 1946.

CHARLES W. NORTON

It is hereby certified that errors appear in the printed specification of the above numbered patent requiring correction as follows: Column 5, line 68, for "to" read *at*; column 14, line 55, after the word "machine" and before the comma insert a closing parenthesis; column 23, line 7, claim 11, for "each" read *said*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.*